US012685252B2

(12) United States Patent
Ertl et al.

(10) Patent No.: US 12,685,252 B2
(45) Date of Patent: Jul. 21, 2026

(54) ORIENTATION SENSING FOR A LAWNMOWER

(71) Applicant: MILWAUKEE ELECTRIC TOOL CORPORATION, Brookfield, WI (US)

(72) Inventors: Daniel R. Ertl, Brookfield, WI (US); Tyler L. Graham, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 807 days.

(21) Appl. No.: 17/885,428

(22) Filed: Aug. 10, 2022

(65) Prior Publication Data

US 2023/0048445 A1    Feb. 16, 2023

Related U.S. Application Data

(60) Provisional application No. 63/231,402, filed on Aug. 10, 2021.

(51) Int. Cl.
*A01D 34/00* (2006.01)
*A01D 34/68* (2006.01)
*A01D 101/00* (2006.01)

(52) U.S. Cl.
CPC ....... *A01D 34/006* (2013.01); *A01D 34/6812* (2013.01); *A01D 2101/00* (2013.01)

(58) Field of Classification Search
CPC .............. A01D 34/006; A01D 34/6812; A01D 2101/00
See application file for complete search history.

(56) References Cited

U.S. PATENT DOCUMENTS 3,230,696 A    1/1966   Liljenberg
3,579,966 A    5/1971   Allina
(Continued)

FOREIGN PATENT DOCUMENTS

CA        2244024 C       1/2003
CN     101610937 A     12/2009
(Continued)

OTHER PUBLICATIONS

WO2021169206A1 machine translation (Year: 2021).*
International Search Report and Written Opinion for Application No. PCT/US2022/074773 dated Nov. 22, 2022 (11 pages).

*Primary Examiner* — Navid Z. Mehdizadeh
*Assistant Examiner* — Oliver Tan
(74) *Attorney, Agent, or Firm* — Dority & Manning, P.A.

(57)        ABSTRACT

A lawnmower may include an inertial measurement device configured to capture data indicative of an orientation of a housing of the lawnmower. The lawnmower may also include a controller coupled (i) to a motor configured to rotate one or more cutting blades and (ii) to the inertial measurement device. The controller may be configured to receive, from the inertial measurement device, the data indicative of the orientation of the housing. The controller may be further configured to determine a three-dimensional position of the housing based on the data. The three-dimensional position of the housing may indicate whether the orientation of the housing is desirable for operation of the lawnmower. The controller may be further configured to control the motor based on the three-dimensional position of the housing.

20 Claims, 22 Drawing Sheets

(56) References Cited

U.S. PATENT DOCUMENTS

| | | | |
|---|---|---|---|
| D227,286 S | 6/1973 | Thorud | |
| 3,750,378 A | 8/1973 | Thorud et al. | |
| 3,820,313 A | 6/1974 | Hoffmann | |
| 4,047,367 A | 9/1977 | Thorud | |
| 4,126,986 A | 11/1978 | Kidd | |
| 4,214,424 A | 7/1980 | Gobin | |
| D304,728 S | 11/1989 | Piorkowski | |
| 4,897,988 A | 2/1990 | Schweitz et al. | |
| D311,009 S | 10/1990 | Wilkins | |
| D346,810 S | 5/1994 | Schulz et al. | |
| 5,398,491 A | 3/1995 | Hartley | |
| D359,291 S | 6/1995 | Tihonovich | |
| D390,576 S | 2/1998 | Shimamura | |
| 5,910,091 A | 6/1999 | Iida et al. | |
| D421,265 S | 2/2000 | Ohsumi et al. | |
| 6,044,634 A | 4/2000 | Velke et al. | |
| D424,070 S | 5/2000 | Danthois | |
| 6,155,034 A | 12/2000 | Velke et al. | |
| D450,064 S | 11/2001 | Concari et al. | |
| D489,734 S | 5/2004 | Lin | |
| D544,501 S | 6/2007 | Chung Lee | |
| D600,254 S | 9/2009 | Lindars et al. | |
| D605,667 S | 12/2009 | Peterson et al. | |
| 7,726,110 B2 | 6/2010 | Nicholson | |
| D620,029 S | 7/2010 | Baetica | |
| D627,371 S | 11/2010 | Baetica | |
| D648,354 S | 11/2011 | Hattori et al. | |
| 8,046,980 B1 | 11/2011 | Schroeck | |
| D652,846 S | 1/2012 | Stratford et al. | |
| D653,265 S | 1/2012 | Stratford et al. | |
| D665,823 S | 8/2012 | Hannig | |
| D685,822 S | 7/2013 | Elgin et al. | |
| D834,071 S | 11/2018 | Näslund et al. | |
| D834,072 S | 11/2018 | Näslund et al. | |
| 2004/0237493 A1 | 12/2004 | Schroeder et al. | |
| 2005/0108999 A1* | 5/2005 | Bucher | A01D 75/28 |
| | | | 56/10.2 R |
| 2005/0257964 A1 | 11/2005 | Derby | |
| 2007/0271892 A1 | 11/2007 | Sasaoka | |
| 2009/0266042 A1 | 10/2009 | Mooney et al. | |
| 2011/0022267 A1 | 1/2011 | Murphy | |
| 2014/0157747 A1 | 6/2014 | Shoji et al. | |
| 2014/0225660 A1* | 8/2014 | Cheng | G06F 3/017 |
| | | | 327/509 |
| 2016/0047463 A1 | 2/2016 | Helin et al. | |
| 2016/0338266 A1 | 11/2016 | Yamaoka et al. | |
| 2017/0006763 A1 | 1/2017 | Bejcek et al. | |
| 2017/0202140 A1 | 7/2017 | Lopez et al. | |
| 2018/0160620 A1 | 6/2018 | Wang et al. | |
| 2019/0269067 A1 | 9/2019 | Fukano et al. | |
| 2019/0346280 A1* | 11/2019 | Mutschler | G06N 20/00 |
| 2020/0107497 A1 | 4/2020 | Ferrell et al. | |
| 2020/0375095 A1 | 12/2020 | Koto et al. | |
| 2021/0251136 A1* | 8/2021 | Kondro | A01D 34/828 |
| 2021/0251143 A1 | 8/2021 | Gaeddert et al. | |

FOREIGN PATENT DOCUMENTS

| | | | | |
|---|---|---|---|---|
| CN | 210202483 U | 3/2020 | | |
| CN | 111406498 A | 7/2020 | | |
| CN | 211671393 U | 10/2020 | | |
| DE | 154054 A1 | 2/1982 | | |
| EP | 3437453 B1 | 3/2021 | | |
| JP | H02127113 U | 10/1990 | | |
| JP | H06169624 A | 6/1994 | | |
| JP | 2007116958 A | 5/2007 | | |
| JP | 2016187978 A1 | 11/2016 | | |
| KR | 20020055433 A | 7/2002 | | |
| KR | 1020060046012 A | 5/2006 | | |
| WO | 9410827 A1 | 5/1994 | | |
| WO | 2010002298 A1 | 1/2010 | | |
| WO | 2010024696 A1 | 3/2010 | | |
| WO | 2014062176 A1 | 4/2014 | | |
| WO | WO-2021169206 A1 * | 9/2021 | | A01D 75/185 |

* cited by examiner

400

ORIENTATION SENSING FOR A LAWNMOWER

RELATED APPLICATIONS

This application claims the benefit of U.S. Provisional Patent Application No. 63/231,402, filed on Aug. 10, 2021, the entire content of which is hereby incorporated by reference.

FIELD

The present disclosure relates to orientation sensing for a lawnmower.

SUMMARY

Lawnmowers described herein include a housing, one or more cutting blades; and a motor configured to rotate the one or more cutting blades. The lawnmowers may also include a handle extending from the housing and configured to be manipulated by a user during operation of the lawnmower. The lawnmowers may also include an inertial measurement device configured to generate data indicative of an orientation of the housing. The lawnmowers may also include a controller connected to the motor and to the inertial measurement device. The controller may be configured to receive, from the inertial measurement device, the data indicative of the orientation of the housing. The controller may be further configured to determine a three-dimensional position of the housing based on the data. The three-dimensional position of the housing may indicate whether the orientation of the housing is desirable for operation of the lawnmower. The controller may be further configured to control the motor based on the three-dimensional position of the housing.

In some embodiments, the controller may be configured to control the motor based on the three-dimensional position of the housing by determining that the three-dimensional position of the housing indicates that the housing is experiencing a tilt angle greater than a predetermined tilt angle threshold, and preventing or stopping operation of the motor in response to determining that the three-dimensional position of the housing indicates that the housing is experiencing the tilt angle greater than the predetermined tilt angle threshold.

In some embodiments, the controller may be configured to control the motor based on the three-dimensional position of the housing by determining that the three-dimensional position of the housing indicates that the tilt angle has been greater than the predetermined tilt angle threshold for longer than a predetermined time period, and preventing or stopping operation of the motor in response to determining that the tilt angle has been greater than the predetermined tilt angle threshold for longer than the predetermined time period.

In some embodiments, the predetermined tilt angle threshold may include a back tilt threshold and a side tilt threshold that are each associated with a respective predetermined time period. In some embodiments, (i) a first angle value of the back tilt threshold is higher than a second angle value of the side tilt threshold. In some embodiments, (ii) a first time value of a first predetermined time period associated with the back tilt threshold is larger than a second time value of a second predetermined time period associated with the side tilt threshold. In some embodiments, both (i) and (ii) are true.

In some embodiments, the predetermined tilt angle threshold may include a first back tilt threshold and a second back tilt threshold that are each associated with a respective predetermined time period. In some embodiments, (i) a first angle value of the first back tilt threshold is lower than a second angle value of the second back tilt threshold and (ii) a first time value of a first predetermined time period associated with the first back tilt threshold is higher than a second time value of a second predetermined time period associated with the second back tilt threshold.

In some embodiments, the controller may be configured to control the motor based on the three-dimensional position of the housing by determining that the three-dimensional position of the housing indicates that the tilt angle is less than a second predetermined tilt angle threshold, and allowing operation of the motor in response to (i) determining that the three-dimensional position of the housing indicates that the tilt angle is less than the second predetermined tilt angle threshold and (ii) receiving a user input indicating that the motor should operate. In some embodiments, the second predetermined tilt angle threshold is less than the predetermined tilt angle threshold.

In some embodiments, the controller may be configured to determine the three-dimensional position of the housing based on the data by executing a filtering scheme that includes averaging a plurality of data samples included in the data over a predetermined time period or for a predetermined number of consecutive data samples.

In some embodiments, the controller may be configured to determine, based on the three-dimensional position of the housing, that the lawnmower is in a storage position. The controller may be further configured to in response to determining that the lawnmower is in the storage position, enter a sleep mode until (i) the controller detects a user input or (ii) the controller detects a change in the three-dimensional position of the housing. The controller may receive the data from the inertial measurement device less frequently in the sleep mode than when the controller is operating outside of the sleep mode.

Method described herein for controlling a lawnmower include receiving, with a controller of the lawnmower and from an inertial measurement device of the lawnmower, data indicative of an orientation of a housing of the lawnmower. The lawnmower may include one or more cutting blades, a motor configured to rotate the one or more cutting blades, and a handle extending from the housing and configured to be manipulated by a user during operation of the lawnmower. The method may further include determining, with the controller, a three-dimensional position of the housing based on the data. The three-dimensional position of the housing may indicate whether the orientation of the housing is desirable for operation of the lawnmower. The method may further include controlling, with the controller, the motor based on the three-dimensional position of the housing.

In some embodiments, controlling the motor based on the three-dimensional position of the housing may include determining, with the controller, that the three-dimensional position of the housing indicates that the housing is experiencing a tilt angle greater than a predetermined tilt angle threshold, and preventing or stopping, with the controller, operation of the motor in response to determining that the three-dimensional position of the housing indicates that the housing is experiencing the tilt angle greater than the predetermined tilt angle threshold.

In some embodiments, controlling the motor based on the three-dimensional position of the housing may include determining, with the controller, that the three-dimensional position of the housing indicates that the tilt angle has been greater than the predetermined tilt angle threshold for longer than a predetermined time period; and preventing or stopping, with the controller, operation of the motor in response to determining that the tilt angle has been greater than the predetermined tilt angle threshold for longer than the predetermined time period.

In some embodiments, the predetermined tilt angle threshold may include a back tilt threshold and a side tilt threshold that are each associated with a respective predetermined time period. In some embodiments, (i) a first angle value of the back tilt threshold is higher than a second angle value of the side tilt threshold. In some embodiments, (ii) a first time value of a first predetermined time period associated with the back tilt threshold is larger than a second time value of a second predetermined time period associated with the side tilt threshold. In some embodiments, both (i) and (ii) are true.

In some embodiments, the predetermined tilt angle threshold includes a first back tilt threshold and a second back tilt threshold that are each associated with a respective predetermined time period. In some embodiments, (i) a first angle value of the first back tilt threshold is lower than a second angle value of the second back tilt threshold and (ii) a first time value of a first predetermined time period associated with the first back tilt threshold is higher than a second time value of a second predetermined time period associated with the second back tilt threshold.

In some embodiments, controlling the motor based on the three-dimensional position of the housing includes determining, with the controller, that the three-dimensional position of the housing indicates that the tilt angle is less than a second predetermined tilt angle threshold, and allowing, with the controller, operation of the motor in response to (i) determining that the three-dimensional position of the housing indicates that the tilt angle is less than the second predetermined tilt angle threshold and (ii) receiving a user input indicating that the motor should operate.

Lawnmowers described herein include a housing, one or more cutting blades, and a motor configured to rotate the one or more cutting blades. The lawnmowers may also include a handle extending from the housing and configured to be manipulated by a user during operation of the lawnmower. The lawnmower may also include an inertial measurement device configured to generate data indicative of an orientation of the housing. The lawnmowers may also include a controller connected to the motor and to the inertial measurement device. The controller may be configured to receive, from the inertial measurement device, the data indicative of the orientation of the housing. The controller may also be configured to determine an orientation of the housing based on the data. The orientation of the housing indicates whether the orientation of the housing is desirable for operation of the lawnmower. The controller may also be configured to control the lawnmower to be in one of a plurality of states based on the orientation of the housing.

In some embodiments, the plurality of states may include a ready state in which the motor is not operating but is allowed to operate in response to a user input indicating that the motor should operate, an operating state in which the motor is operating, and a stop state in which the motor is disabled and is configured not to operate regardless of whether of the user input indicates that the motor should operate. In some embodiments, the controller may be configured to determine that the orientation of the housing indicates that the housing is experiencing a tilt angle greater than a predetermined tilt angle threshold, and transition the lawnmower to the stop state to prevent or stop operation of the motor in response to determining that the orientation position of the housing indicates that the housing is experiencing the tilt angle greater than the predetermined tilt angle threshold.

In some embodiments, the controller may be configured to implement a hysteresis analysis for transitioning between at least two states of the plurality of states by changing from a first state to second state in response to (i) receiving a predetermined amount of data samples that indicate a consistent orientation of the lawnmower or (ii) receiving data samples that indicate the consistent orientation of the lawnmower over a predetermined time period. In some embodiments, a first predetermined amount of data samples or a first predetermined time period over which data samples are received that indicate the consistent orientation of the lawnmower for transitioning from a first state to a second state may be different than a second predetermined amount of data samples or a second predetermined time period over which data samples are received that indicate the consistent orientation of the lawnmower for transitioning (i) from the second state to the first state, (ii) from the first state to a third state, (iii) from the third state to the first state, or between other states.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

DETAILED DESCRIPTION

Figure 1:
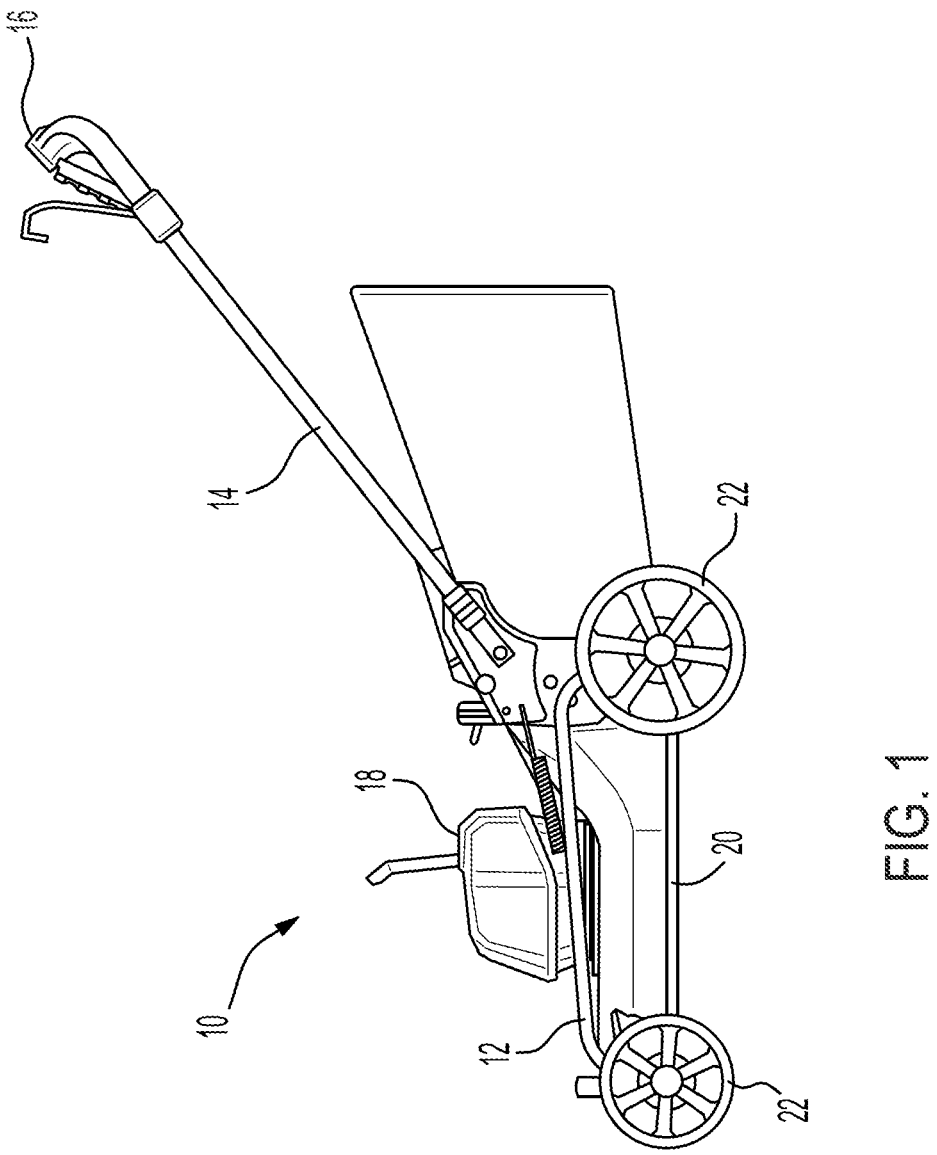
FIG. 1 is a lawnmower, according to some embodiments.

FIG. 1 illustrates a lawnmower 10 (e.g., a walk-behind/push lawnmower 10) according to one embodiment. The lawnmower 10 includes a housing 12 and a handle 16 coupled to the housing 12 by support beams 14. A motor housing 18 is coupled to an upper portion of the housing 12 and houses a motor configured to drives cutting blades 20. The blades 20 are coupled to a lower portion of the housing 12. The lawnmower 10 includes a plurality of wheels 22 driven by the motor. In some embodiments, the plurality of wheels 22 are driven by an auxiliary motor within the motor housing 18.

Figure 2A:
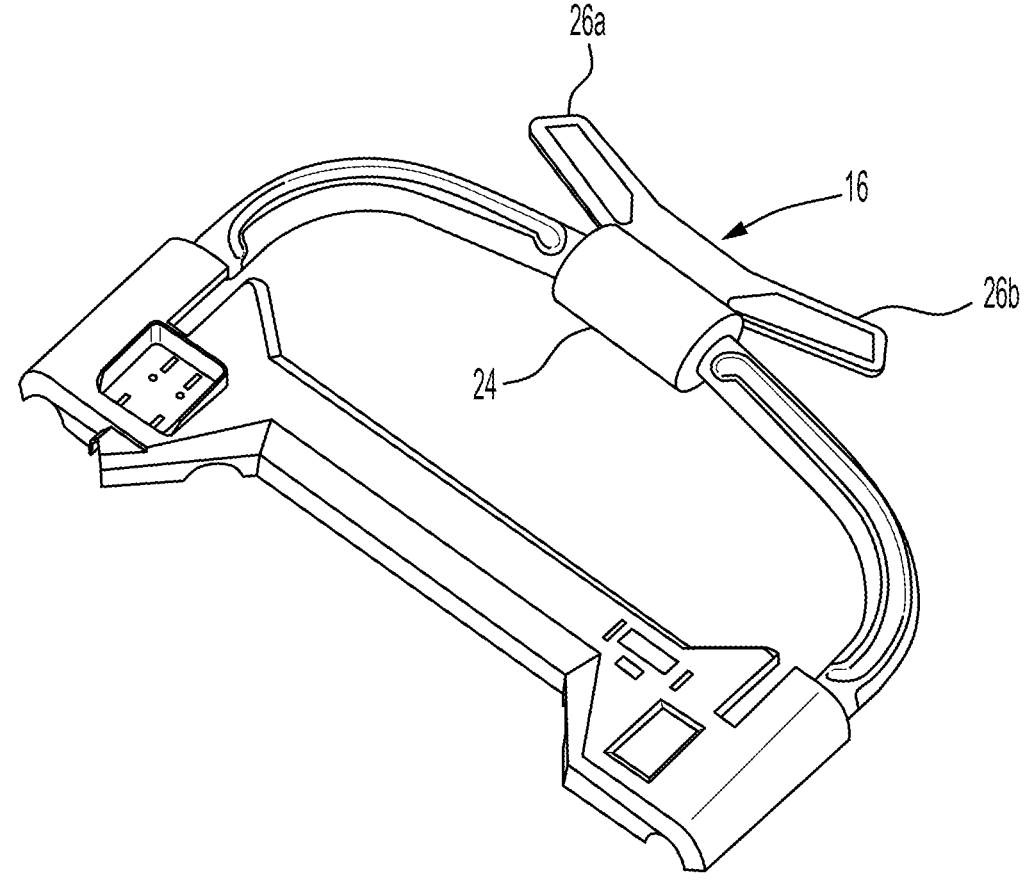
FIGS. 2A-2B are perspective views of a handle of the lawnmower of FIG. 1, according to some embodiments.
Figure 2B:
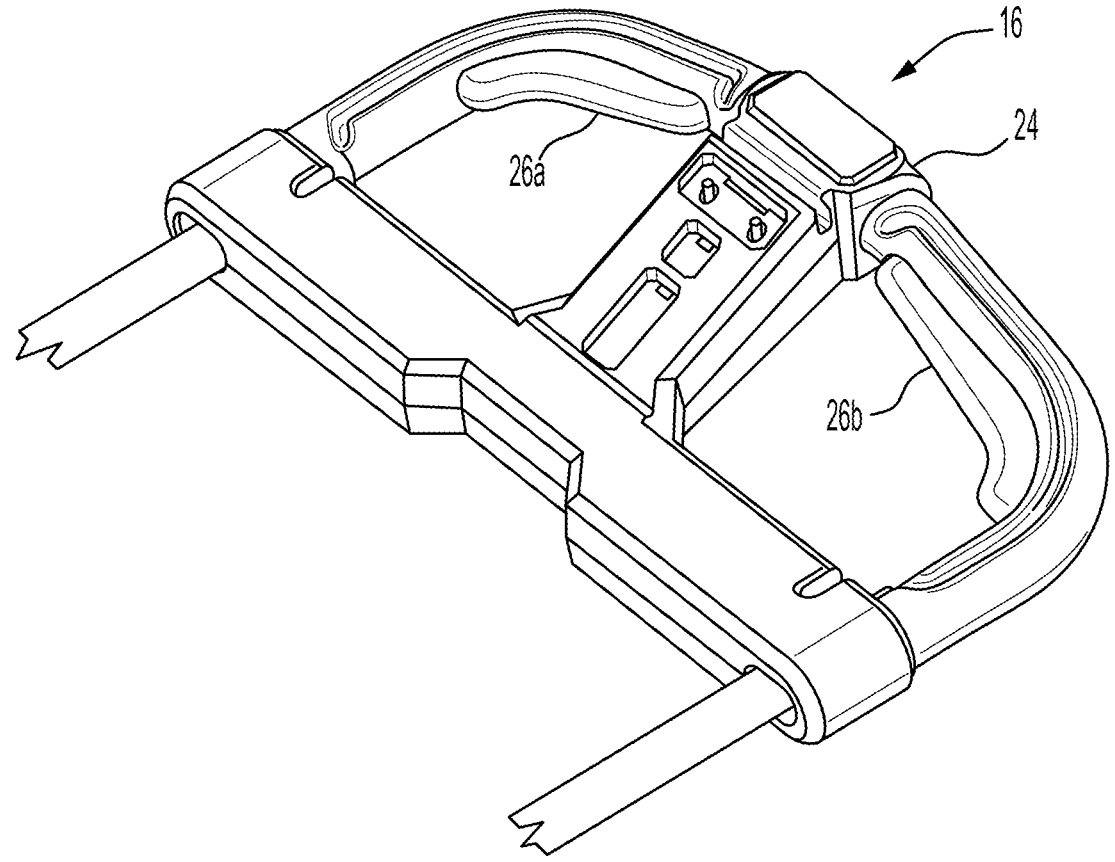
Figure 3A:
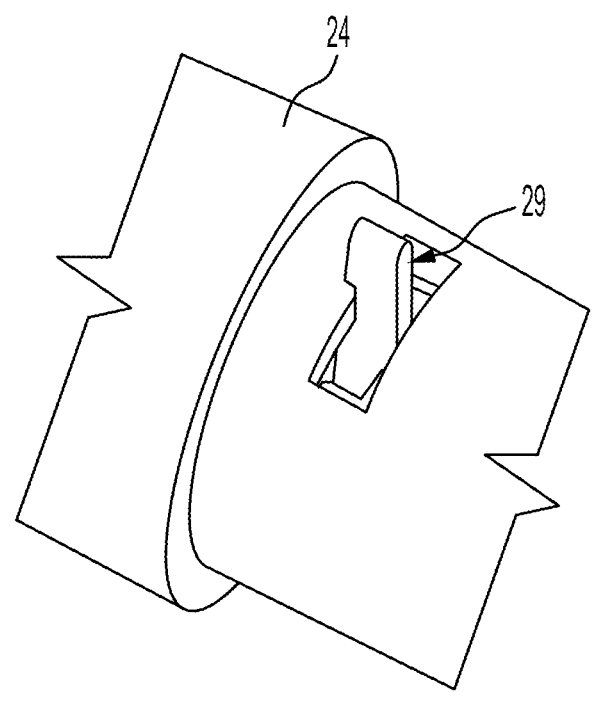
FIG. 3A is a perspective view of the handle of FIG. 2 with a portion of the housing removed to show a contactless switch assembly, according to some embodiments.

FIGS. 2A-2B illustrate the handle 16, according to some embodiments. The handle 16 includes a handle housing 24. A first paddle 26a and a second paddle 26b (e.g., paddles 26) extend from the handle housing 24 and act as a switch or trigger. Accordingly, operation of the first paddle 26a and the second paddle 26b may drive the motor and/or the auxiliary motor, as described in more detail below. A contactless switch assembly 29 is situated within the handle housing 24, as shown in FIG. 3A.

Figure 3B:
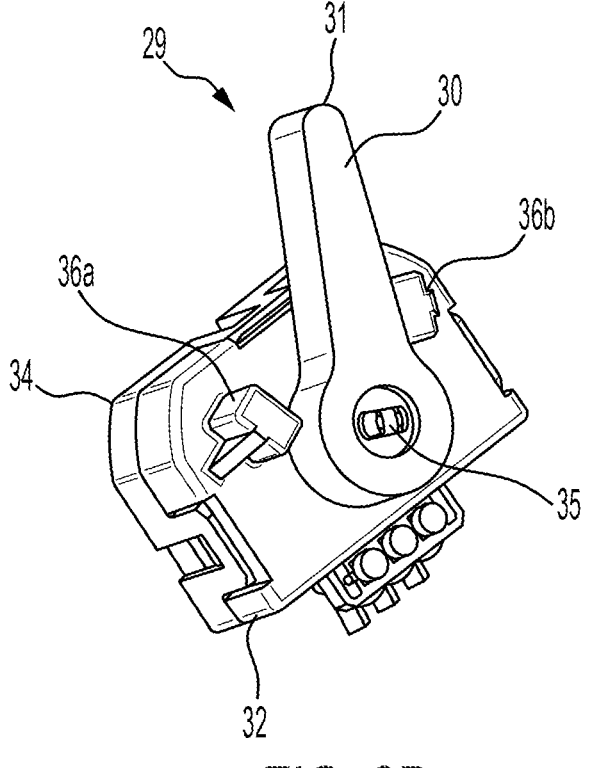
FIG. 3B is a perspective view of the contactless switch assembly of FIG. 3A, according to some embodiments.
Figure 4:
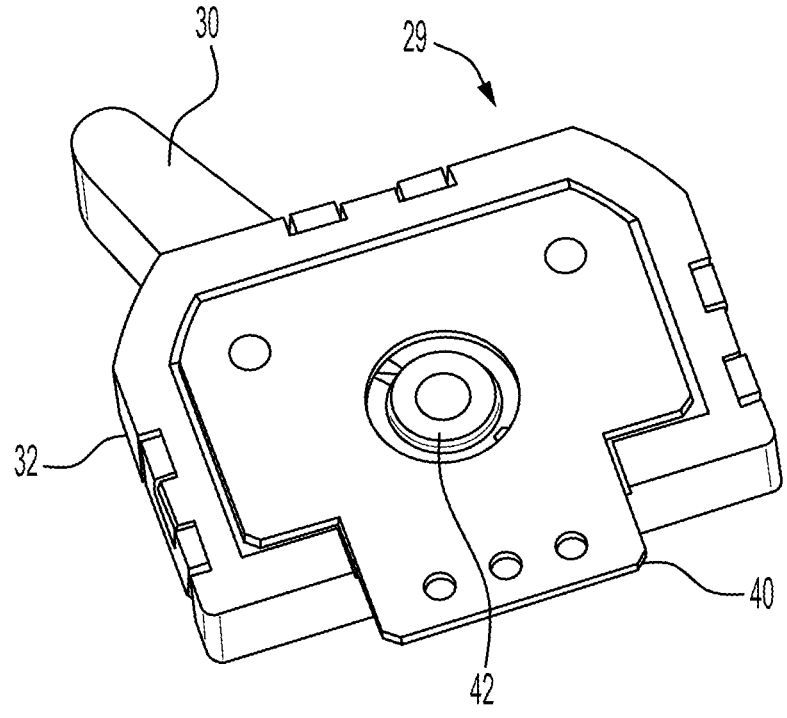
FIG. 4 is a perspective view of the contactless switch assembly of FIG. 3B with a lower housing removed, according to some embodiments.

FIG. 3B illustrates the contactless switch assembly 29 including a contactless switch 30, an upper housing 32, and a lower housing 34. The contactless switch 30 is external to the upper housing 32 and the lower housing 34. Having the contactless switch 30 external to the housing (i.e., upper housing 32 and lower housing 34 combined) helps prevent dust, water, and other particulates from getting into the housing. The contactless switch assembly 29 can also be made smaller as a result of having fewer components within the housing. As the paddles 26 are operated, the contactless switch 30 rotates about a pivot point 35. In some embodiments, the contactless switch 30 includes an upper portion 31 that contacts the paddles 26. Movement of the contactless switch 30 is bound by a first protrusion 36a and a second protrusion 36b. FIG. 4 provides a perspective view of the back of the contactless switch assembly 29 with the lower housing 34 removed. A printed circuit board (PCB) 40 is coupled to the upper housing 32. A magnet 42 is positioned in the center of the PCB 40 and is coupled to the contactless switch 30 such that rotation of the contactless switch 30 results in rotation of the magnet 42. The PCB 40 includes, for example, one or more Hall-effect sensors 50 (see FIG. 7B) in proximity to the magnet 42 for sensing changes in magnetic flux as the magnet 42 rotates. In some embodiments, the components of the PCB 40 are covered by a room temperature vulcanizing ("RTV") silicone or ultraviolet ("UV") glue to protect the components from dust, water, and other particulates.

Figure 5:
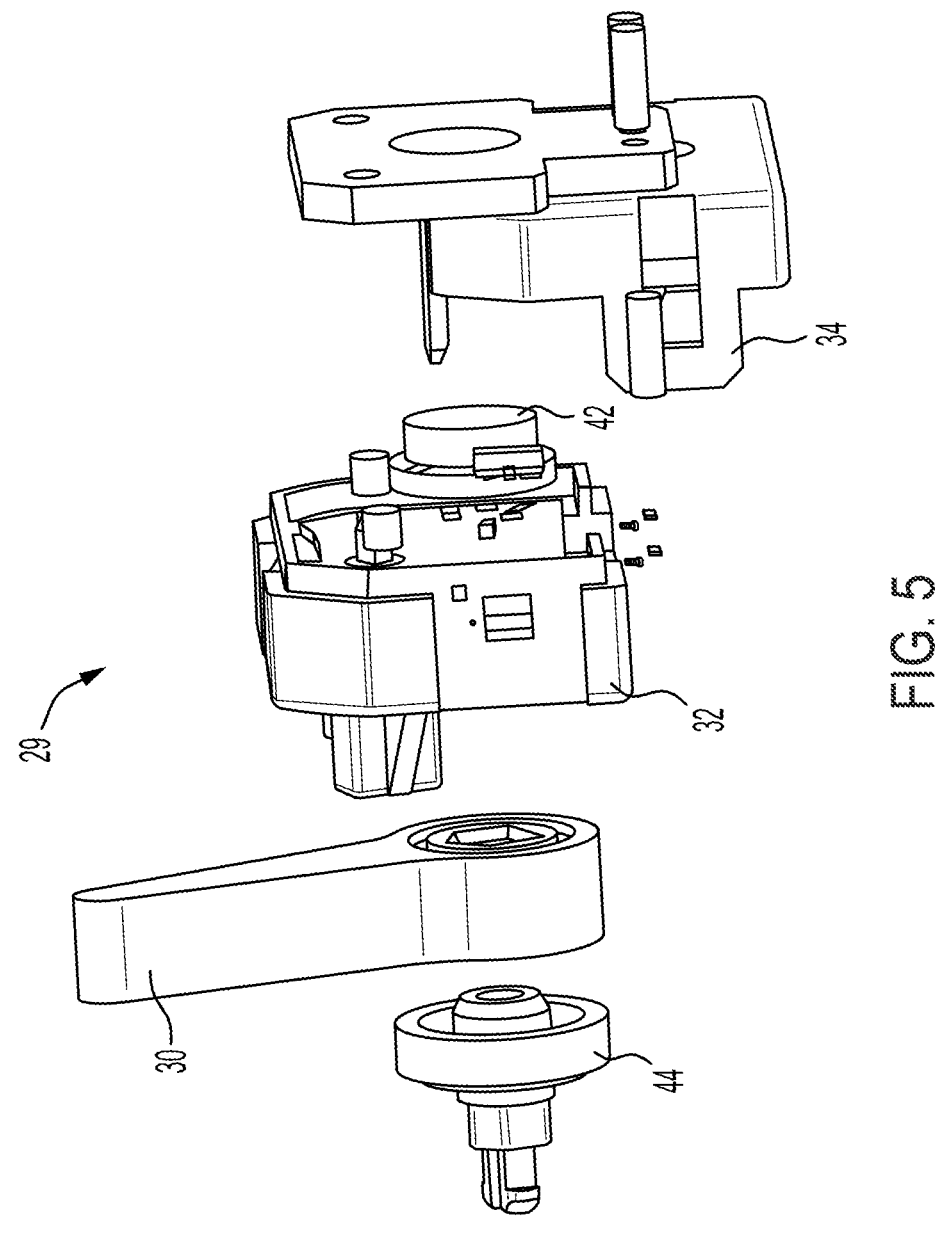
FIG. 5 is an exploded view of the contactless switch assembly of FIG. 3B, according to some embodiments.
Figure 6A:
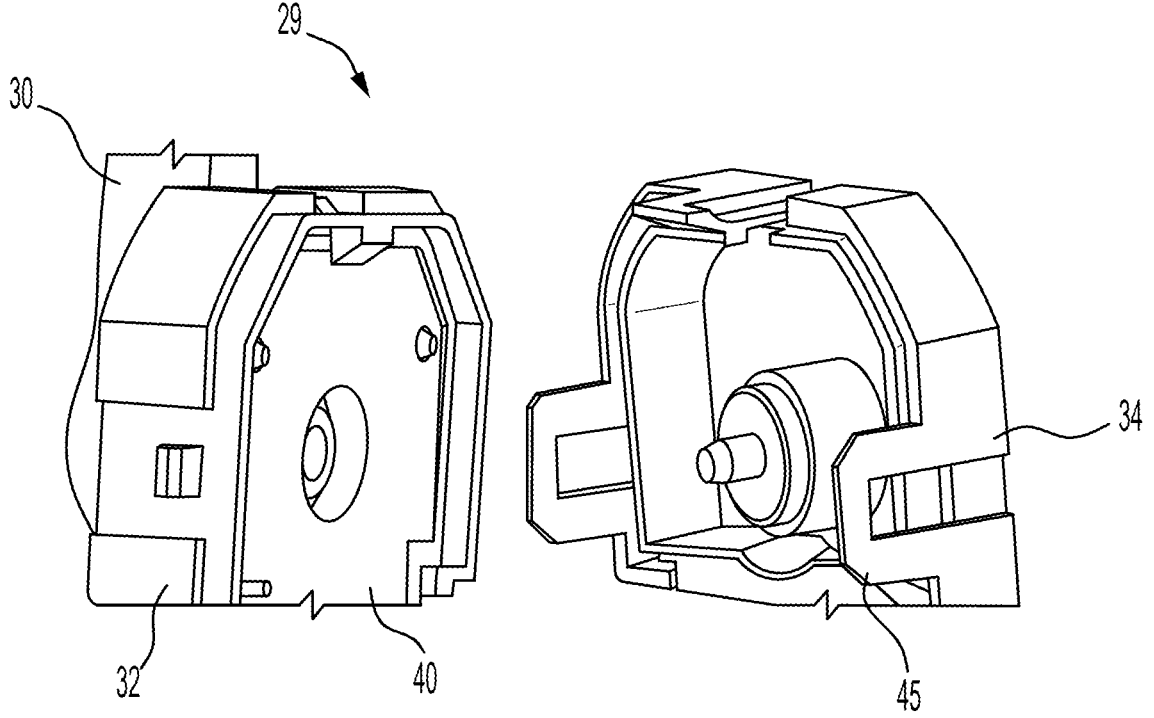
FIGS. 6A-6C are perspective views of the contactless switch assembly of FIG. 3B, according to some embodiments.
Figure 6C:
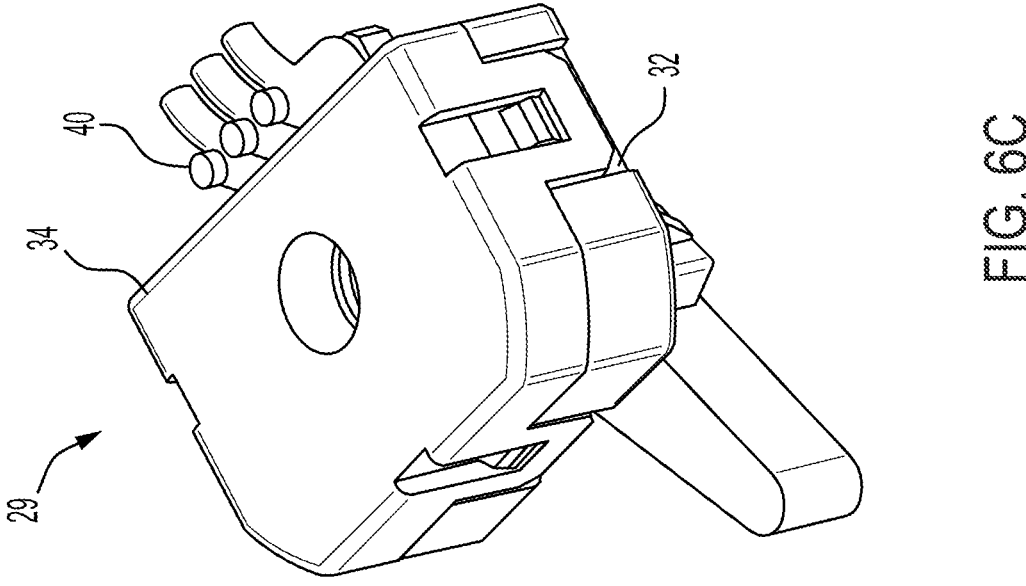
Figure 6B:
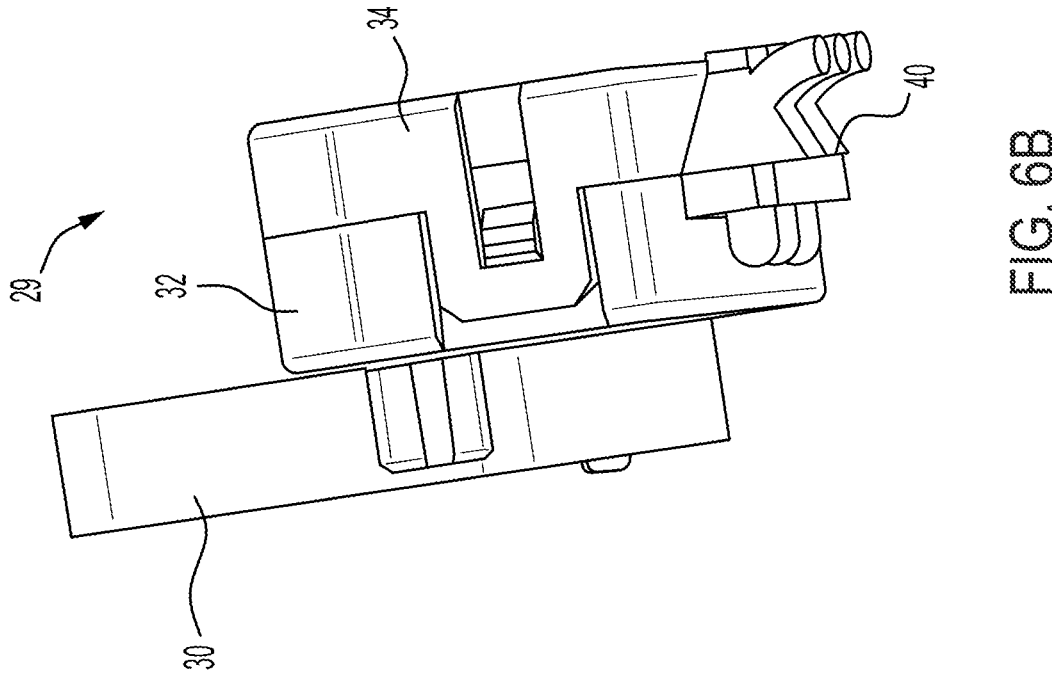

FIG. 5 illustrates an exploded view of the contactless switch assembly 29. The contactless switch 30 is coupled to the upper housing 32. The magnet 42 is placed within a rotator 44, which is coupled to the contactless switch 30 through the upper housing 32. The PCB 40 is situated near the magnet 42, rotator 44, and upper housing 32. In some embodiments, the magnet 42 includes positioning features for insert molding or press fitting. The lower housing 34 is situated over the PCB 40 and selectively couples to the upper housing 32. As illustrated in FIG. 6A, the lower housing 34 couples to the upper housing 32 via clamps 45. FIG. 6B illustrates the contactless switch assembly 29 for an alternative perspective. As illustrated, the PCB 40 may extrude from the upper housing 32 and the lower housing 34 for making electrical connections to the PCB 40. FIG. 6C provides an additional perspective view of the contactless switch assembly 29.

Figure 7A:
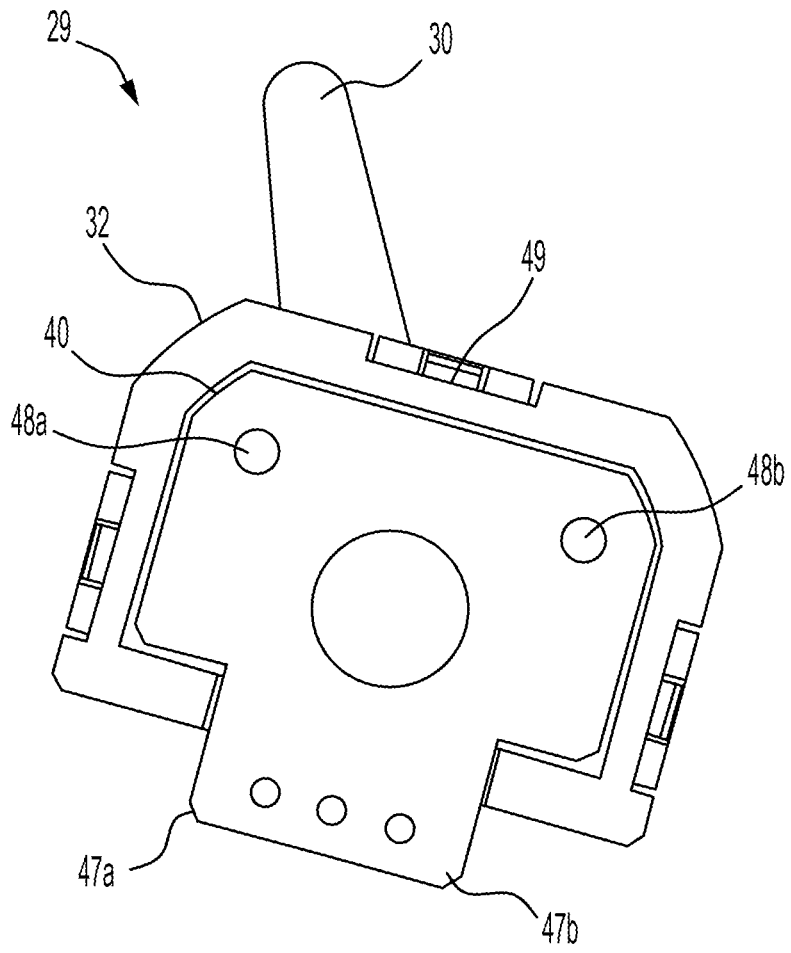
FIGS. 7A-7B are perspective views of the contactless switch assembly of FIG. 3B with a lower housing removed, according to some embodiments.
Figure 7B:
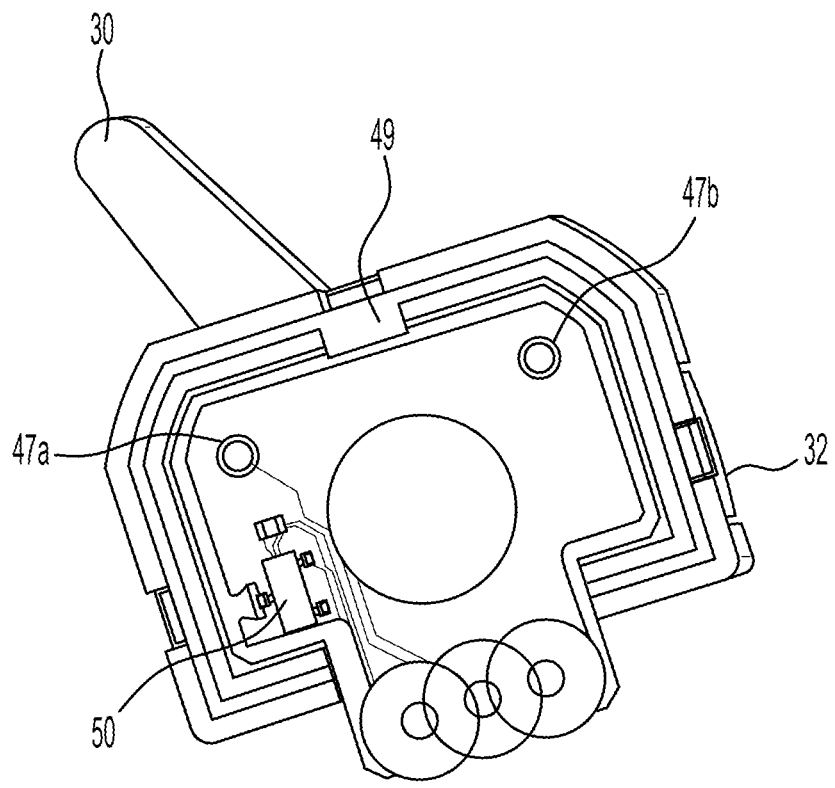
Figure 8:
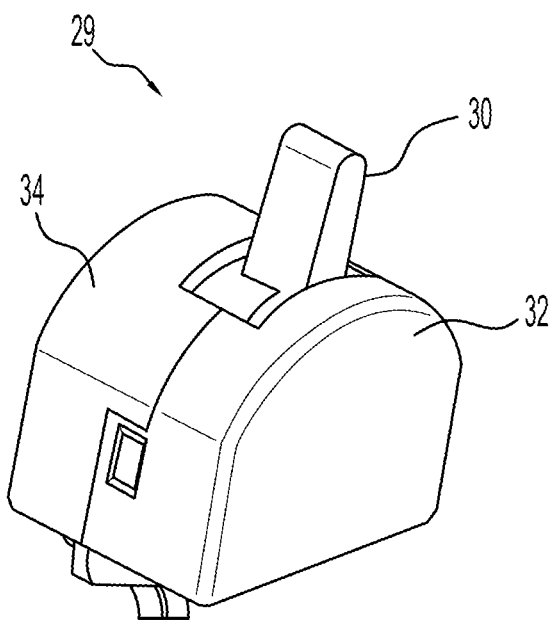
FIG. 8 is a perspective view of another embodiment of a contactless switch assembly, according to some embodiments.

FIGS. 7A-7B illustrate perspective views of the contactless switch assembly 29 with the lower housing 34 removed. The PCB 40 may couple to the upper housing 32 via a first pin 48*a*, a second pin 48*b*, and a snap assembly 49. Additionally, the PCB 40 may include a first corner 47*a* and a second corner 47*b* that are rounded corners.

Figure 9:
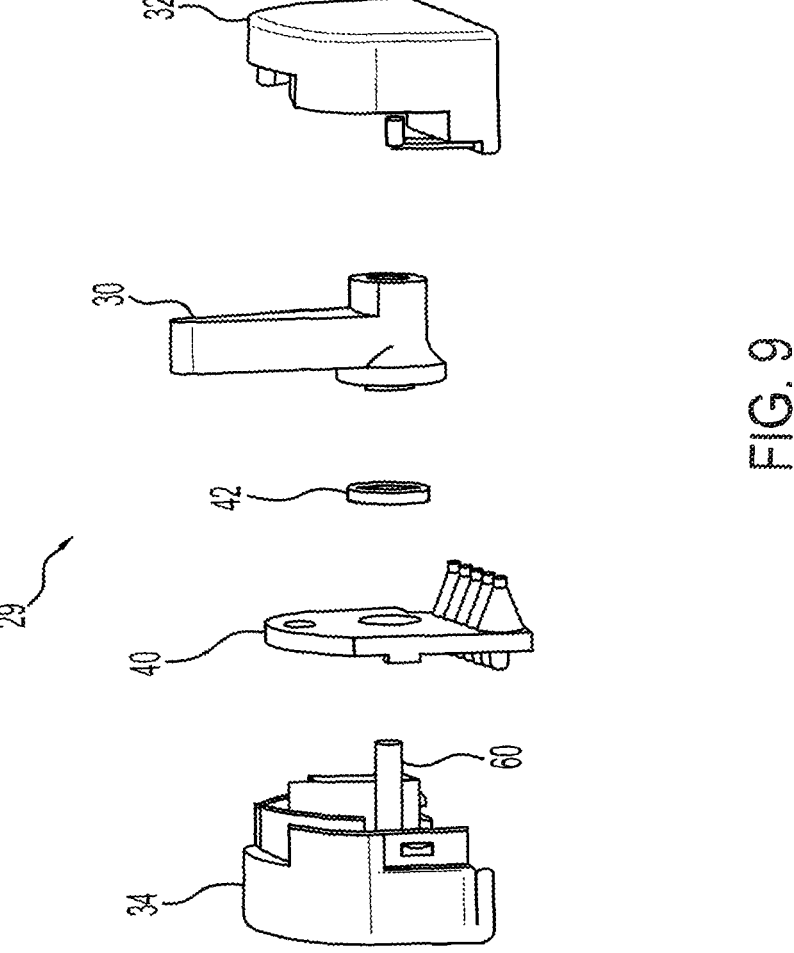
FIG. 9 is an exploded view of the contactless switch assembly of FIG. 8, according to some embodiments.
Figure 10:
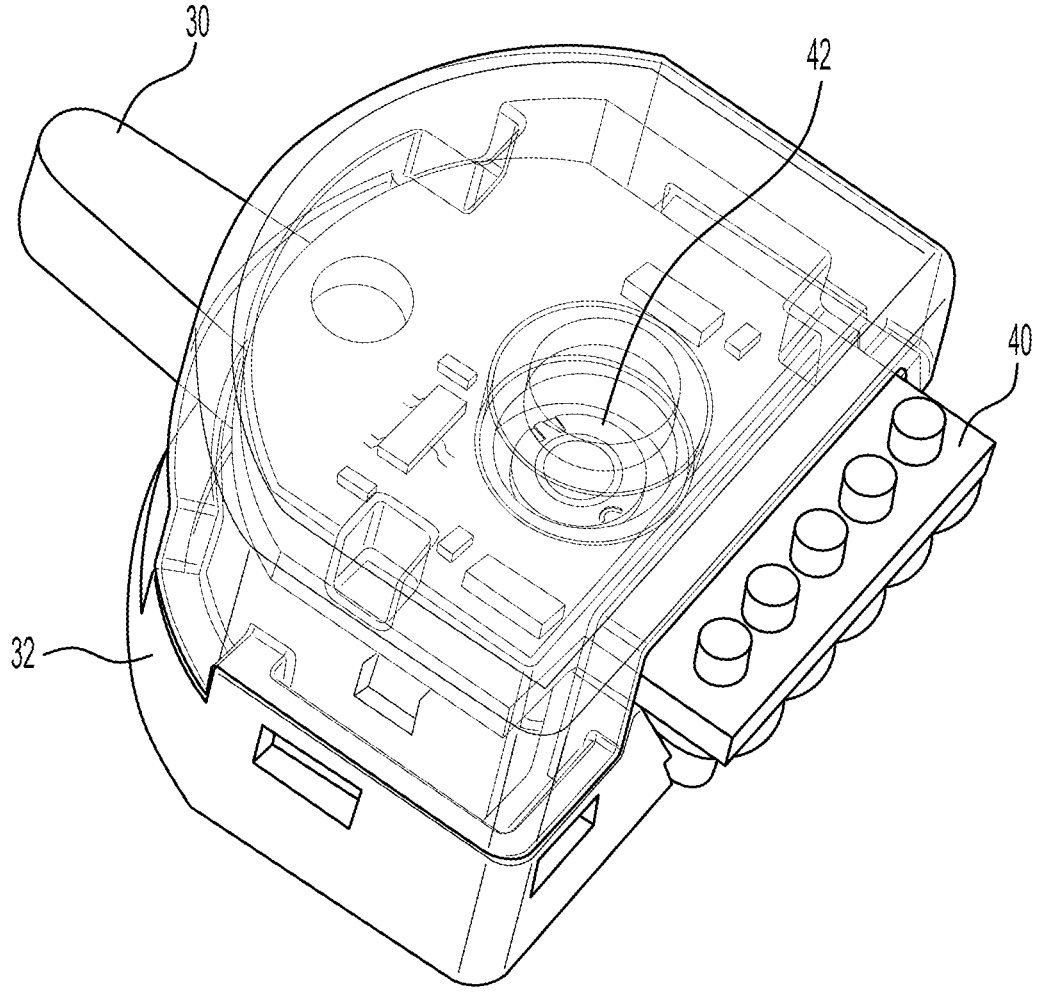
FIG. 10 is a perspective view of the contactless switch assembly of FIG. 8 with a lower housing removed, according to some embodiments.
Figure 11:
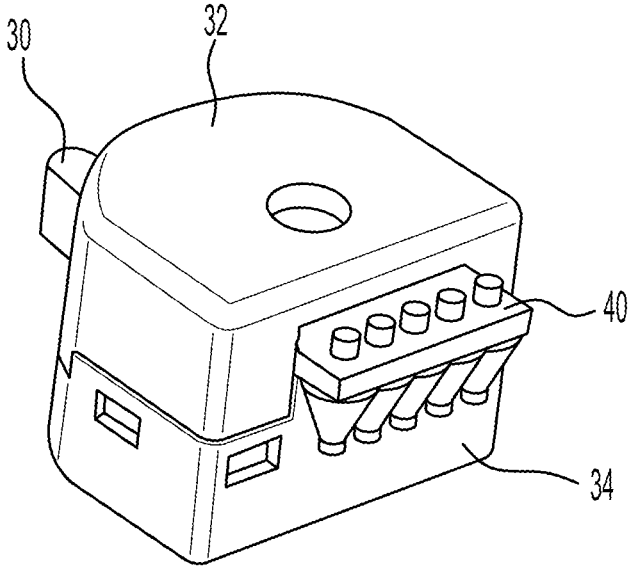
FIG. 11 is a perspective view of the contactless switch assembly of FIG. 8, according to some embodiments.

FIGS. 8-11 illustrate a variety of views of the contactless switch assembly 29 according to another embodiment. FIG. 9, for example, provides the PCB 40 coupled to the lower housing 34. The magnet 42 is coupled between the PCB 40 and the contactless switch 30 such that rotation of the contactless switch 30 results in rotation of the magnet 42. The upper housing 32 then couples to the lower housing 34. The lower housing 34 includes a pole 60 configured to hold the PCB 40, the magnet 42, and the contactless switch 30 in place. In the embodiment of FIGS. 8-11, the contactless switch 30 is internal to the combined upper housing 32 and lower housing 34.

Figure 12:
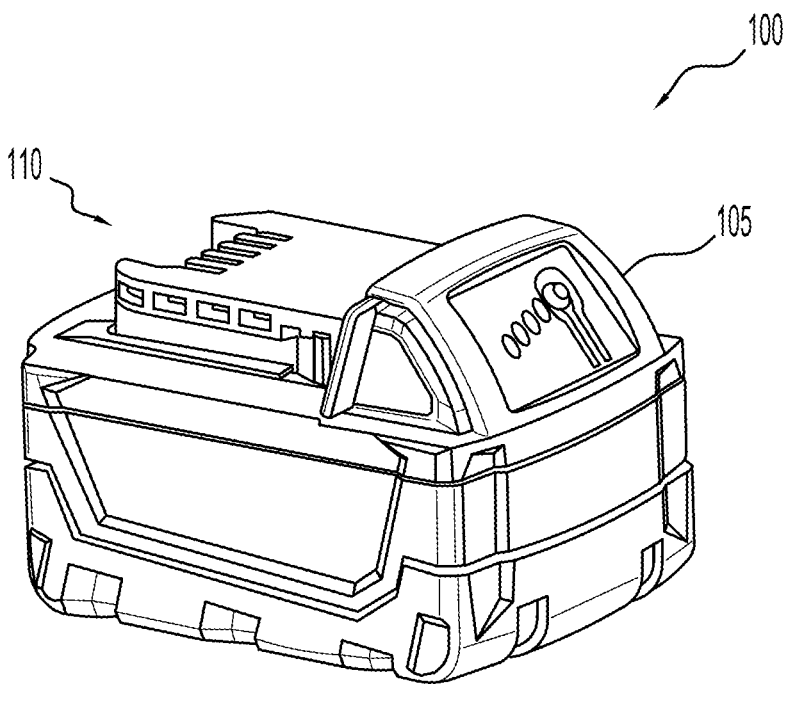
FIG. 12 is a perspective view of a battery pack, according to some embodiments.

In some embodiments, the lawnmower 10 is a battery-powered lawnmower. FIG. 12 illustrates a battery pack 100 that includes a housing 105 and an interface portion 110 for connecting the battery pack 100 to a device, such as the lawnmower 10.

Figure 13:
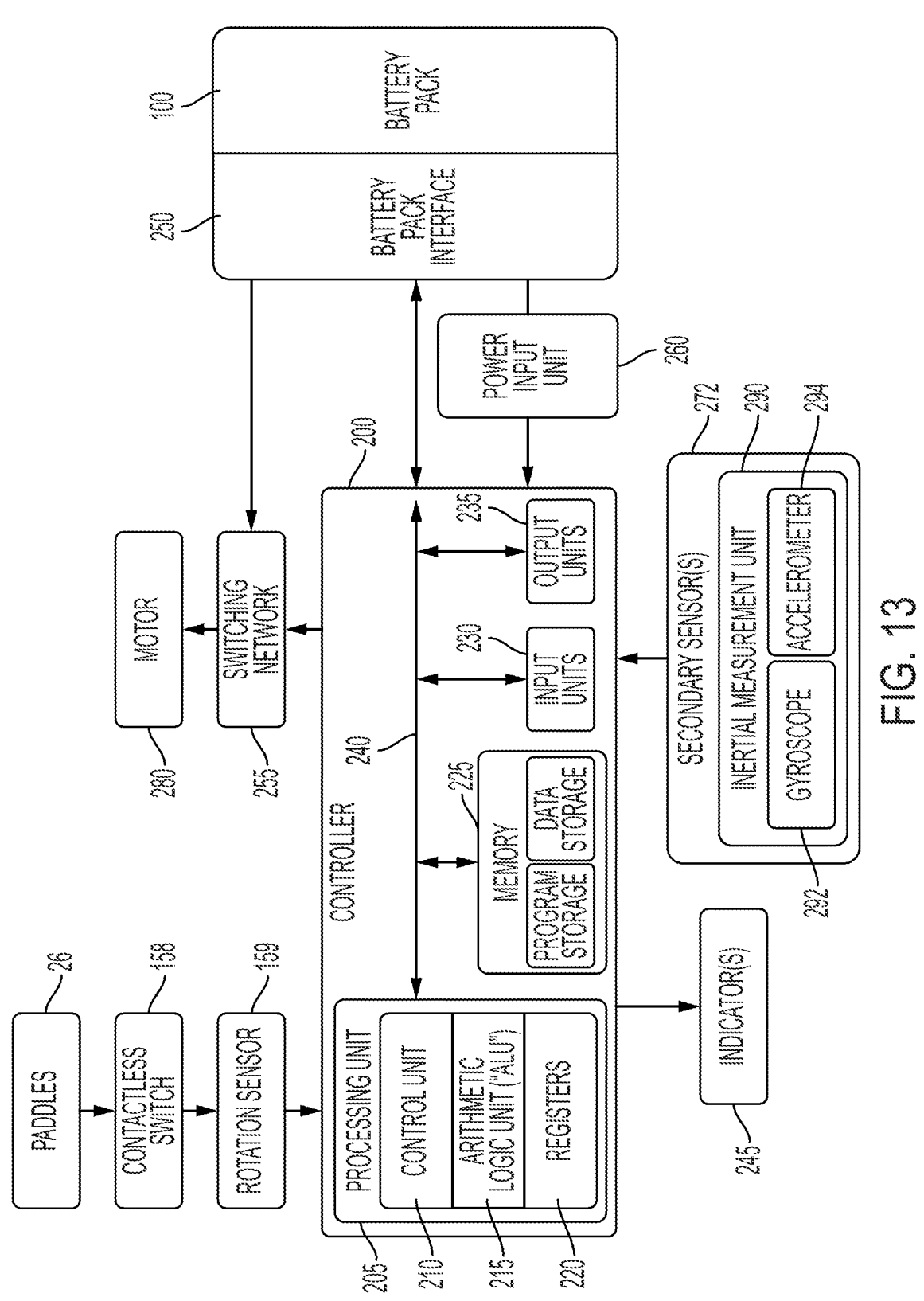
FIG. 13 is a block diagram of a control system for the lawnmower of FIG. 1, according to some embodiments.

A controller 200 for the lawnmower 10 is illustrated in FIG. 13. The controller 200 is electrically and/or communicatively connected to a variety of modules or components of the lawnmower 10. For example, the illustrated controller 200 is connected to indicators 245, secondary sensor(s) 272 (e.g., a speed sensor, a voltage sensor, a temperature sensor, a current sensor, etc.), the paddles 26 (via the contactless switch 30 and a rotation sensor 159), a power switching network 255, and a power input unit 260. In some embodiments, the secondary sensor(s) 272 include, among other sensor(s), an inertial measurement unit (IMU) 290 (e.g., inertial measurement device 290) configured to detect the orientation of the housing 12 of the lawnmower 10. In some embodiments, the IMU 290 is configured to communicate with the controller 200 using a specific protocol (e.g., inter-integrated circuit [I2C], serial peripheral interface [SPI], etc.).

In some embodiments, the IMU 290 includes at least one of a gyroscope 292, an accelerometer 294, and another orientation sensing device (e.g., a magnetometer). The gyroscope 292 may be configured to measure an angular velocity of the housing 12 of the lawnmower 10. The accelerometer 294 may be configured to measure an acceleration of the housing 12 of the lawnmower 10. In some embodiments, data from the IMU 290 is utilized by the controller 200 to determine whether to prevent, allow, and/or stop operation of the lawnmower 10 (e.g., operation of the motor 280 that drives the blades 20 and/or the auxiliary motor that drives one or more of the wheels 22) based on a determined orientation of the housing 12 of the lawnmower 10, as explained in greater detail below.

The controller 200 includes a plurality of electrical and electronic components that provide power, operational control, and protection to the components and modules within the controller 200 and/or lawnmower 10. For example, the controller 200 includes, among other things, a processing unit 205 (e.g., a microprocessor, an electronic processor, an electronic controller, a microcontroller, or another suitable programmable device), a memory 225, input units 230, and output units 235. In some instances, the controller 200 may be referred to as an electronic processor and/or action performed by the controller 200 may be referred to as being performed by the electronic processor. The processing unit 205 includes, among other things, a control unit 210, an arithmetic logic unit ("ALU") 215, and a plurality of registers 220 (shown as a group of registers in FIG. 13), and is implemented using a computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 13 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instruction that are capable of being stored in a RAM of the memory 225 (e.g., during execution), a ROM of the memory 225 (e.g., on a generally permanent basis), or another non-transitory computer readable medium such as another memory or a disc. Software included in the implementation of the lawnmower 10 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The controller 200 drives the motor 280 to rotate the blades 20 and/or the plurality of wheels 22 in response to a user's actuation of the paddles 26. Depression of the paddles 26 actuates the contactless switch 30. The magnet 42 coupled to the contactless switch 30 rotates with actuation of the contactless switch 30. Rotation of the magnet 42 is sensed by the rotation sensor 159, which outputs a signal to the controller 200 to drive the motor 280, and therefore the blades 20 and/or the plurality of wheels 22. In some embodiments, the controller 200 controls a power switching network 255 (e.g., a FET switching bridge) to drive the motor 280. For example, the power switching network 255 may include a plurality of high side switching elements (e.g., FETs) and a plurality of low side switching elements. The controller 200 may control each of the plurality of high side switching elements and the plurality of low side switching elements to drive each phase of the motor 280. When the paddles 26 are released, the controller 200 may apply a braking force to the motor 280. For example, the power switching network 255 may be controlled to more quickly deaccelerate the motor 280. In some embodiments, the controller 200 drives one or more auxiliary motors to drive the plurality of wheels 22. For example, the motor 280 is controlled to drive the blades 20, and the auxiliary motor is controlled to drive the plurality of wheels 22. The auxiliary motor may be controlled via a second power switching network.

The indicators 245 are also connected to the controller 200 and receive control signals from the controller 200 to turn on and off or otherwise convey information based on different states of the lawnmower 10. The indicators 245 include, for example, one or more light-emitting diodes (LEDs), or a display screen. The indicators 245 can be configured to display conditions of, or information associated with, the lawnmower 10.

The battery pack interface 250 is connected to the controller 200 and is configured to couple with the battery pack 100. The battery pack interface 250 includes a combination of mechanical (e.g., a battery pack receiving portion) and electrical components configured to and operable for interfacing (e.g., mechanically, electrically, and communicatively connecting) the lawnmower 10 with the battery pack 100. The battery pack interface 250 is coupled to the power input unit 260. The battery pack interface 250 transmits the power received from the battery pack 100 to the power input unit 260. The power input unit 260 includes active and/or passive components (e.g., voltage step-down controllers, voltage converters, rectifiers, filters, etc.) to regulate or control the power received through the battery pack interface 250 and to the controller 200. In some embodiments, the battery pack interface 250 is also coupled to the power switching network 255. The operation of the power switching network 255, as controlled by the controller 200, determines how power is supplied to the motor 280.

Figure 14:
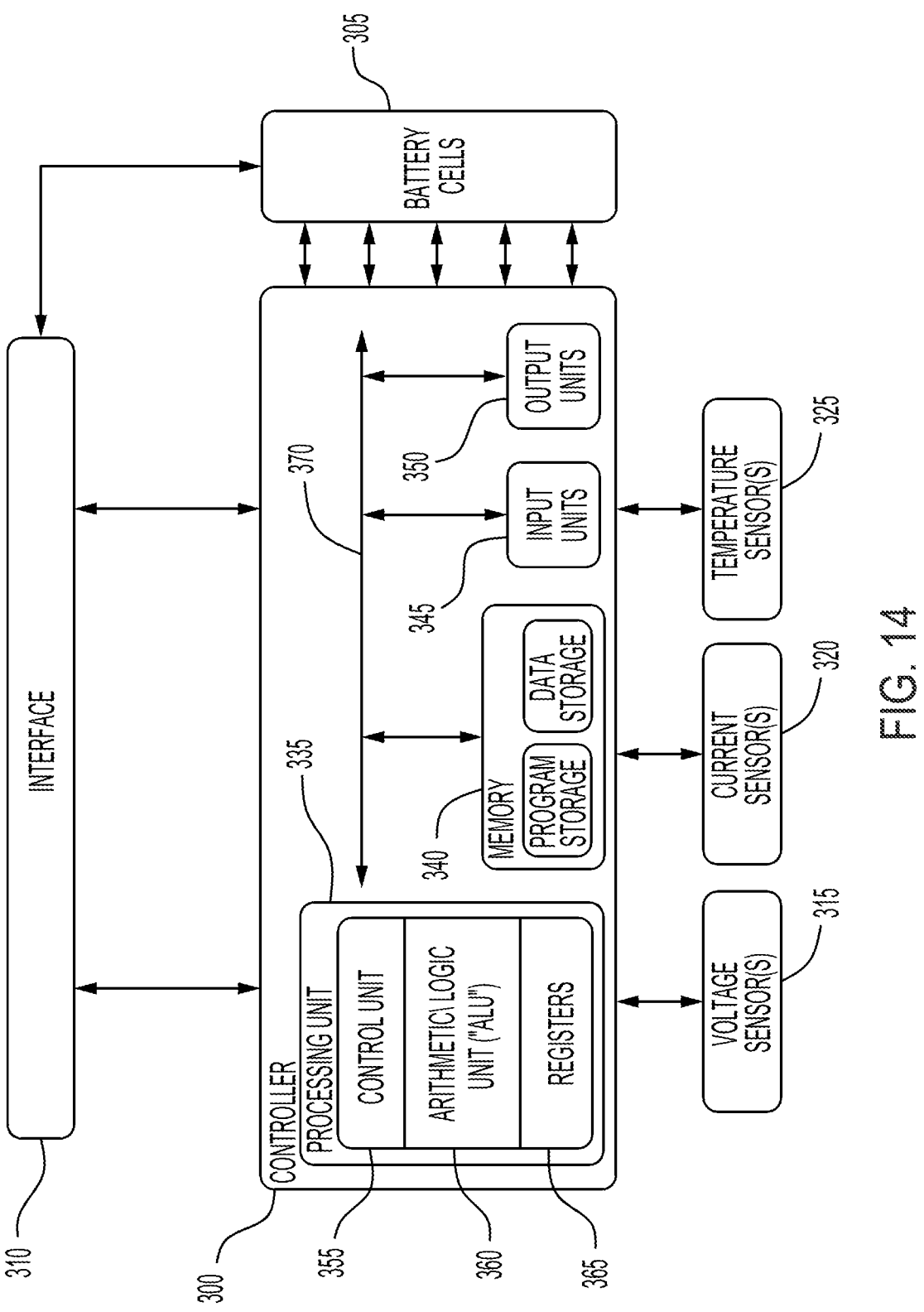
FIG. 14 is a block diagram of a control system for the battery pack of FIG. 12, according to some embodiments.

FIG. 14 illustrates a control system for the battery pack 100. The control system includes a controller 300. The controller 300 is electrically and/or communicatively connected to a variety of modules or components of the battery pack 100. For example, the illustrated controller 300 is connected to one or more battery cells 305 and an interface 310 (e.g., the interface portion 110 of the battery pack 100 illustrated in FIG. 12). The controller 300 is also connected to one or more voltage sensors or voltage sensing circuits 315, one or more current sensors or current sensing circuit 320, and one or more temperature sensors or temperature sensing circuits 325. The controller 300 includes combinations of hardware and software that are operable to, among other things, control the operation of the battery pack 100, monitor a condition of the battery pack 100, enable or disable charging of the battery pack 100, enable or disable discharging of the battery pack 100, etc.

The controller 300 includes a plurality of electrical and electronic components that provide power, operational control, and protection to the components and modules within the controller 300 and/or the battery pack 100. For example, the controller 200 includes, among other things, a processing unit 335 (e.g., a microprocessor, a microcontroller, or another suitable programmable device), a memory 340, input units 345, and output units 350. The processing unit 335 includes, among other things, a control unit 355, an arithmetic logic unit ("ALU") 360, and a plurality of registers 365 (shown as a group of registers in FIG. 14), and is implemented using a computer architecture (e.g., a modified Harvard architecture, a von Neumann architecture, etc.). The processing unit 335, the memory 340, the input units 345, and the output units 350, as well as the various modules or circuits connected to the controller 200, are connected by one or more control and/or data buses (e.g., common bus 370). The control and/or data buses are shown generally in FIG. 14 for illustrative purposes. The use of one or more control and/or data buses for the interconnection between and communication among the various modules, circuits, and components would be known to a person skilled in the art in view of the invention described herein.

The memory 340 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 335 is connected to the memory 340 and executes software instructions that are capable of being stored in a RAM of the memory 340 (e.g., during execution), a ROM of the memory 340 (e.g., on a generally permanent basis), or another non-transitory computer readable medium such as another memory or a disc. Software included in the implementation of the battery pack 100 can be stored in the memory 340 of the controller 200. The software includes, for example, firmware, one or more applications, program data, filters, rules, one or more program modules, and other executable instructions. The controller 300 is configured to retrieve from the memory 340 and execute, among other things, instructions related to the control processes and methods described herein. In other constructions, the controller 300 includes additional, fewer, or different components.

The interface 310 includes a combination of mechanical components (e.g., rails, grooves, latches, etc.) and electrical components (e.g., one or more terminals) configured to and operable for interfacing (e.g., mechanically, electrically, and communicatively connecting) the battery pack 100 with another device (e.g., a power tool, a battery pack charger, the lawnmower 10, etc.). For example, the interface 310 is configured to receive power via a power line between the one or more battery cells 305 and the interface 310. The interface 310 is also configured to communicatively connect to the controller 300.

Figure 15:
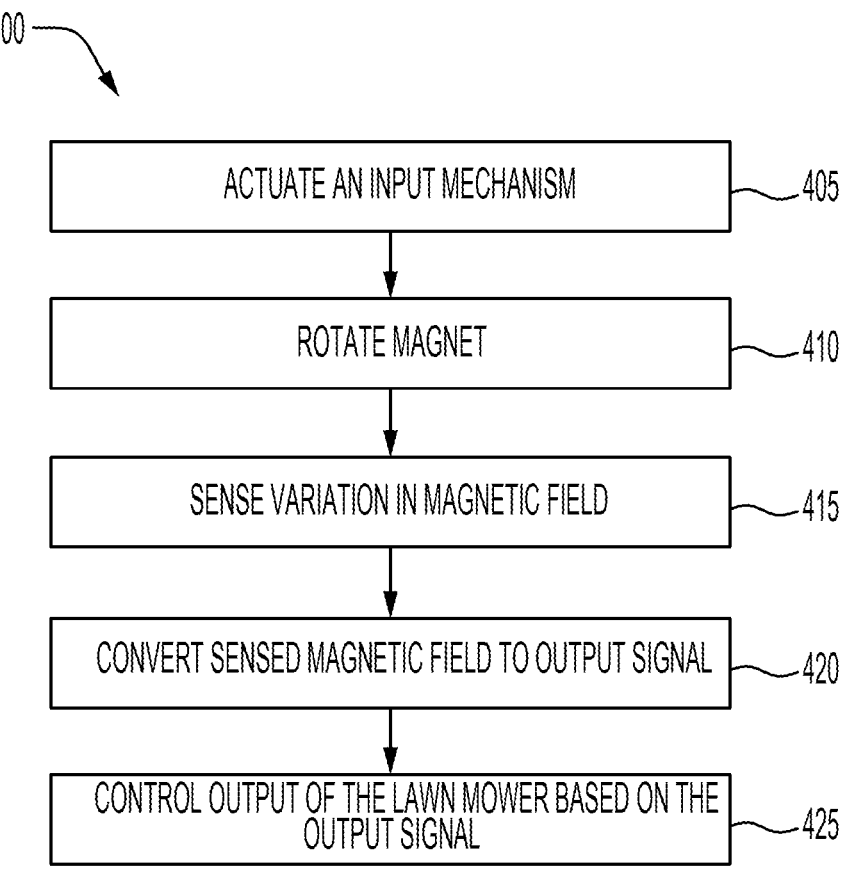
FIG. 15 is a block diagram of a method performed by the controller of FIG. 13, according to some embodiments.

FIG. 15 provides a method 400 for controlling the output of the lawnmower 10, according to some embodiments. At block 405, an input switch of the lawnmower is actuated. For example, the paddles 26 are actuated, thereby rotating the contactless switch 30. At block 410, the magnet 42 rotates. For example, rotation of the contactless switch 30 results in rotation of the magnet 42.

At block 415, the rotation sensor 159 sensor detects variation in a magnetic field generated by the rotating magnet. In one embodiment, the rotation sensor 159 is a rotational Hall-effect magnetic sensor. The rotation sensor 159 may be configured to detect a change in a magnetic flux density component, which results from the rotation of the magnet. At block 420, the rotation sensor 159 converts the sensed magnetic field to an output signal, which may be provided to a controller, such as controller 200, as described above. In some embodiments, the rotation sensor 159 is an analog sensor. In some embodiments, the output of the rotation sensor 159 is a voltage that varies linearly with the rotation of the magnet 42. However, in other examples, the output may be a non-linear output, such as a stepped output, a logarithmic output, etc.

At block 425, the controller 300, upon receiving the output of the rotation sensor 159, controls the motor 280 based on the received sensor output. For example, the controller 300 receives the output from the rotation sensor 159 and drives the motor 280 by controlling the power switching network 255 based on the output from the rotation sensor 159, as described above. In some embodiments, the controller 300 controls the output of the auxiliary motor based on the received sensor output.

In some embodiments, in block 415, the rotation sensor 159 is a digital magnetic sensor senses the variation in the magnetic field in addition to or instead of the analog sensor. In these embodiments, the digital magnetic sensors convert the sensed magnetic field to a digital output.

As mentioned above, in some embodiments, data from the IMU 290 is utilized by the controller 200 to determine whether to prevent, allow, and/or stop operation of the lawnmower 10 (e.g., operation of the motor 280 that drives the blades 20 and/or operation of the auxiliary motor that drives one or more of the wheels 22) based on a determined orientation of the housing 12 of the lawnmower 10. In other words, data from the IMU 290 allows the controller 200 to prevent and/or stop operation of the lawnmower 10 in response to determining that the lawnmower 10 is in a storage position or otherwise in an orientation that is undesirable for operation.

Figure 16:
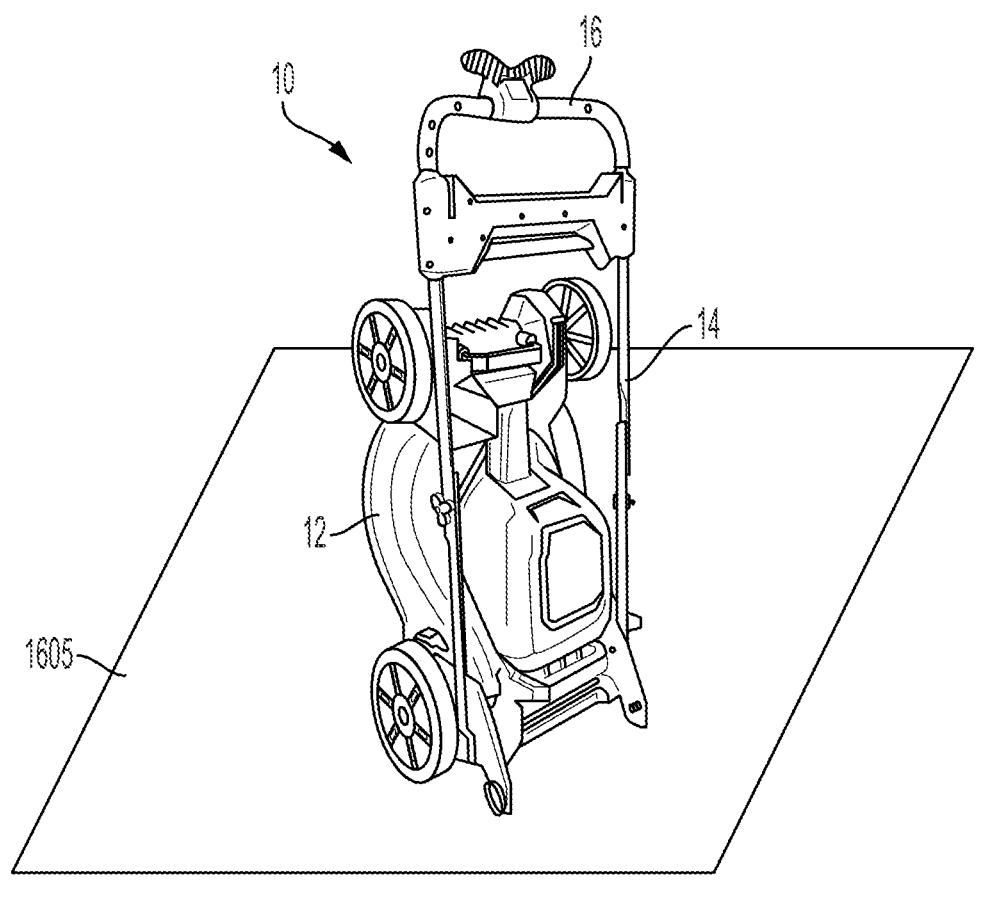
FIG. 16 illustrates the lawnmower of FIG. 1 in an upright position in a storage position, according to some embodiments.
Figure 17:
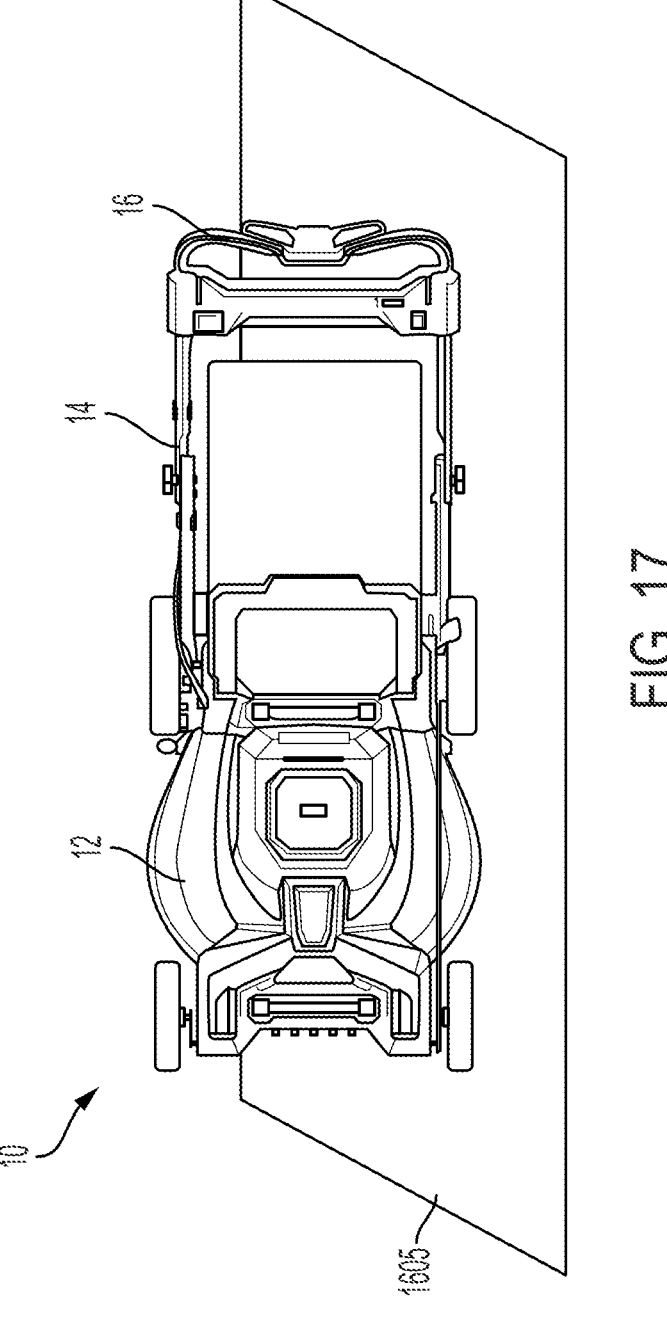
FIG. 17 illustrates the lawnmower of FIGS. 1 and 16 tilted on its side with respect to the ground, according to some embodiments.

For example, FIG. 16 shows the lawnmower 10 in an upright position on the ground 1605 in the storage position with the handle 16 and support beams 14 folded toward the housing 12. Because the housing 12 of the lawnmower 10 is in an upright position (e.g., a back tilt angle of approximately ninety degrees with respect to the ground 1605) with the blade 20 exposed, the storage position is a position that is not desirable for operation. As another example, FIG. 17 shows the lawnmower 10 tilted on its side with respect to the ground 1605 (e.g., a side tilt angle of approximately ninety degrees with respect to the ground 1605). Again, because the blade 20 within the housing 12 is exposed, the tilted position shown in FIG. 17 is a position that is not desirable for operation.

In some embodiments, the controller 200 is configured to use data from the gyroscope 292, the accelerometer 294, or both to determine a three-dimensional orientation of the housing 12 of the lawnmower 10. For example, data from the IMU 290 allows the controller 200 to detect a change in motion, a change in force, or both experienced by the housing 12 of the lawnmower 10. By maintaining a reference to the ground 1605, the IMU 290 may be configured to output a difference with respect to the reference to the ground 1605 that is caused by a change in motion, a change in force, or both. The controller 200 may be configured to compare the value(s) from the IMU 290 to one or more threshold values to determine whether the lawnmower 10 is in the storage position and/or in another position that is undesirable for operation.

In some embodiments, the IMU 290 provides data corresponding to a tilt/orientation of the housing 12 in multiple directions (e.g., front, back, both sides, etc.). For example, the gyroscope 292 and/or the accelerometer may be of the 3-axis, 6-axis, or 9-axis variety. In some embodiments, the controller 200 may use different thresholds (i.e., set points) of tilt angle and/or time for determining an undesirable operating position for each direction and/or combination of directions. For example, a back tilt shutdown threshold may be higher than a side tilt shutdown threshold because it may be expected that the user pushes the handle 16 downward to elevate the front wheels 22 slightly (i.e., back tilt) when turning the lawnmower 10 during operation. In some embodiments, depending on whether the three-dimensional orientation of the lawnmower 10 is within one or more threshold values or ranges and/or depending on whether the paddles 26 are actuated, the controller 200 will control the lawnmower 10 to be in one of three different states: a "READY" state 1805, an "OPERATING" state 1810, and a "STOP" state 1815.

In some embodiments, the OPERATING state is a state in which the lawnmower 10 operates normally with both the motor 280 and the auxiliary motor being allowed to operate assuming that a user input is received (e.g., via actuation of the paddles 26) that instructs the lawnmower 10 to operate. In some embodiments, the STOP state indicates that at least one of the thresholds of undesirable orientation has been exceeded by the lawnmower 10, and the motor 280 and the auxiliary motor will not be allowed to operate even if the paddles 26 are actuated. Upon either wakeup or reset, the controller 200 may be configured to enter a READY state and begin to poll the IMU 290 to determine the orientation of the lawnmower 10 to determine whether a change in orientation should prompt a change in control state of the lawnmower 10. In some instances, in the READY state, the lawnmower 10 may be configured to operate (e.g., enable the motor 280 and/or the auxiliary motor) in response to receiving the user input (e.g., via actuation of the paddles 26) that instructs the lawnmower 10 to operate. In response to receiving the user input that instructs the lawnmower 10 to operate, the controller 200 may enter the OPERATING state. When in the READY state, if the controller 200 determines that at least one of the thresholds of undesirable orientation has been exceeded by the lawnmower 10, the controller 200 may enter the STOP state to prevent the motor 280 and the auxiliary motor from operating even if the paddles 26 are actuated.

Figure 18:
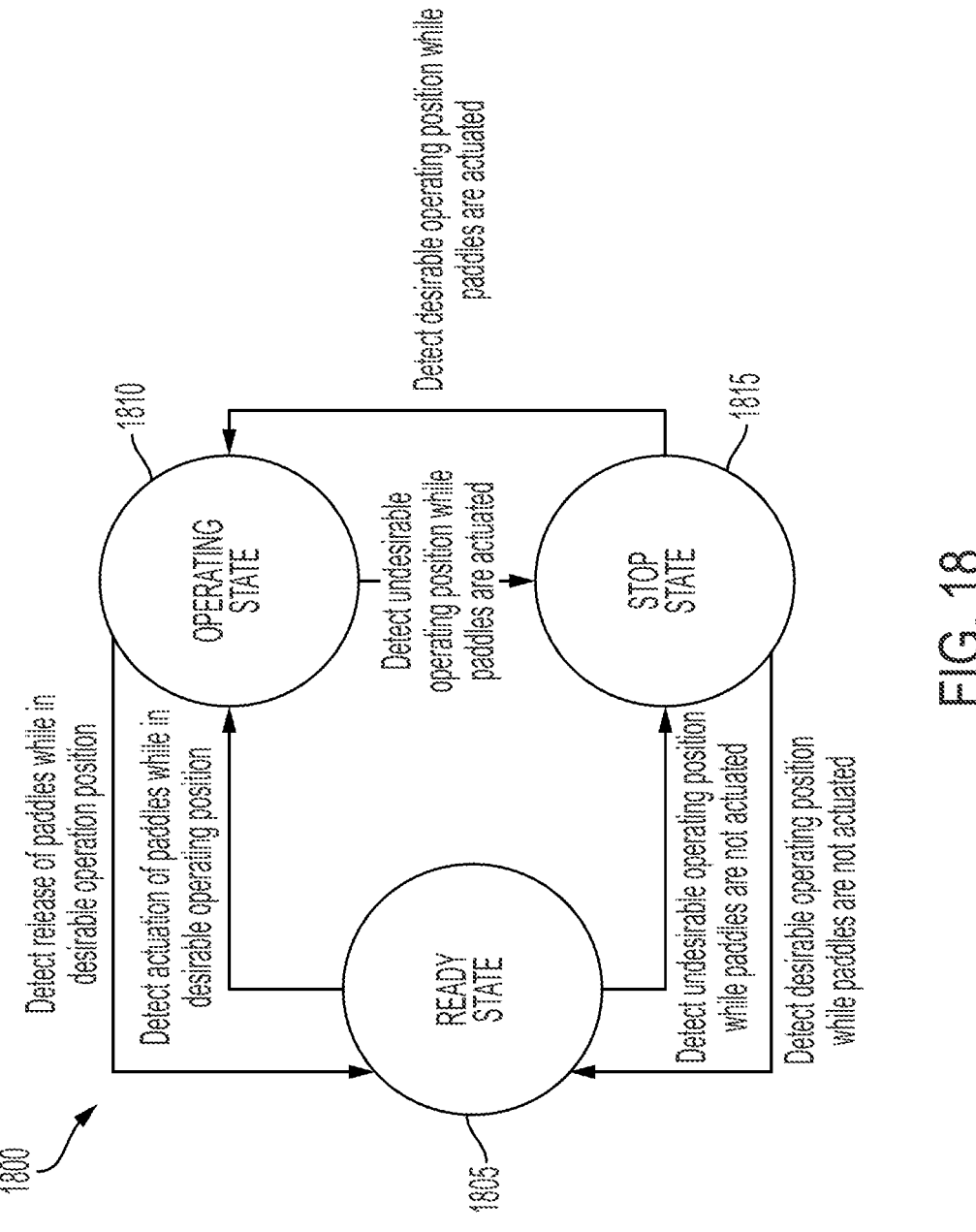
FIG. 18 is a state diagram implemented by the control system of FIG. 13, according to some embodiments.

FIG. 18 illustrates a state diagram 1800 implemented by the controller 200 of the lawnmower 10 according to some example embodiments. The state diagram 1800 shows how the controller 200 transitions between the READY, OPERATING, and STOP states as explained above. In some instances, the controller 200 may not transition directly or immediately from the STOP state 1815 to the OPERATING state 1810. In other words, the state change arrow from the STOP state 1815 to the OPERATING state 1810 may not be present in some instances. Rather, if the controller 200 is in the STOP state 1815 while the paddles 26 are actuated and the controller 200 determines that the operating position of the lawnmower 10 has changed from an undesirable operating position to a desirable operating position, the controller 200 may transition to the READY state 1805 until the paddles 26 are released and re-actuated while the lawnmower 10 is in a desirable operating position. As another example, if the controller 200 is in the STOP state 1815 while the paddles 26 are actuated and the controller 200 determines that the operating position of the lawnmower 10 has changed from an undesirable operating position to a desirable operating position, the controller 200 may wait a predetermined time period (e.g., one second, three seconds, etc.) before entering the OPERATING state 1810 and enabling the motor 280 and/or the auxiliary motor.

In some embodiments, the controller 200 or the IMU 290 performs an internal calculation to convert raw data from the IMU 290 (e.g., from the gyroscope 292, the accelerometer 294, or both) to a three-dimensional position indicative of an orientation of the housing 12. In some embodiments, the internal calculation includes at least one of (i) a filtering scheme to prevent nuisance indications/detections of undesirable orientation and (ii) a hysteresis analysis for transitioning between states 1805, 1810, 1815 (e.g., between the OPERATING state 1810 and the STOP state 1815 that may be respectively referred to as an "ON" state and an "OFF" state with respect to the motor 280 and the auxiliary motor).

For example, the filtering scheme may average a plurality of data samples from the IMU 290 over a predetermined time period or for a predetermined amount of consecutive data samples. Such averaging/filtering may prevent anomalous data samples (e.g., caused by the lawnmower 10 bumping an object in the lawn) from falsely indicating that the lawnmower 10 is in an undesirable orientation. In other words, a data sample that is an outlier with respect to surrounding data samples may be smoothed out due to the filtering scheme to prevent the controller 200 from detecting an undesirable orientation and then almost immediately detecting a desirable orientation.

As an example of the hysteresis analysis for transitioning between two of the states 1805, 1810, 1815, the controller 200 may refrain from changing states (especially from the STOP state 1815 to the OPERATING state 1810) until a predetermined amount of consecutive data samples or consecutive groups of averaged data samples indicate that the lawnmower 10 has changed orientations. In some instances, the controller 200 may refrain from changing states until data samples or groups of data samples have been received from the IMU 290 for a predetermined time period that indicate that the lawnmower 10 has changed orientations. For example, the controller 200 may refrain from changing states when a single data sample or a single group of averaged data samples indicates that the orientation of the lawnmower 10 has changed from undesirable to desirable because such data sample information may be caused by the lawnmower 10 being bumped by the user rather than an actual change in orientation of the lawnmower 10. Accordingly, switching states in response to a certain amount of data samples or a predetermined time period of consistent data samples avoids frequent switching of operational states (e.g., nuisance switching) when the orientation of the lawnmower 10 has not actually changed. For example, upon the controller 200 switching to the STOP state 1815, the controller 200 may be unable to switch back to the OPERATING state 1810 for a predetermined time period (e.g., one second, three seconds, etc.) of receiving data samples that indicate that the lawnmower 10 has changed orientations to be back in a desirable orientation for operation.

In some instances, the average number of data samples and/or the predetermined time period used in the filtering scheme and/or the hysteresis analysis described above may be different depending on the current state of the controller 200 and/or depending on the state to which the data samples indicate that the controller 200 should switch. As explained in the above example, upon the controller 200 switching to the STOP state 1815, the controller 200 may be unable to switch back to the OPERATING state 1810 for a first predetermined time period (e.g., three seconds, etc.). However, upon the controller 200 switching to the OPERATING state 1810 from the STOP state 1815 or the READY state 1805, the controller 200 may be able to immediately switch to the STOP state 1815 if one or more data samples from the IMU 290 indicate an undesirable orientation of the lawnmower 10. Alternatively, upon the controller 200 switching to the OPERATING state 1810 from the STOP state 1815 or the READY state 1805, the controller 200 may be unable to switch to the STOP state 1815 for a second predetermined time period (e.g., 100 milliseconds, etc.) that is less than the first predetermined time period. The controller 200 may function in this manner to prevent frequent switching between states (i.e., nuisance switching) while still allowing the lawnmower 10 to be shut down quickly in response to an undesirable orientation being detected based on one or more data samples from the IMU 290.

In some embodiments, threshold values that cause the controller 200 to determine whether the lawnmower 10 is in a desirable orientation or an undesirable orientation may be different depending on the current state of the controller 200 and/or depending on the state to which the data samples indicate that the controller 200 should switch. For example, a first threshold (e.g., a first tilt shutdown threshold) that causes the controller 200 to leave the OPERATING state 1810 and enter the STOP state 1815 to stop operation of the motor 280 and/or the auxiliary motor may include a tilt angle of thirty degrees or greater. Continuing this example, a second threshold (e.g., a first restart threshold) that causes the controller 200 to enter the OPERATING state 1810 to start or restart operation of the motor 280 and/or the auxiliary motor may include a tilt angle less than the tilt angle of the first threshold (e.g., a tilt angle of ten degrees or less). Such different thresholds may prevent nuisance shutdown of the lawnmower 10 during operation (e.g., when a user pushes the handle 16 downward to elevate the front wheels 22 between zero and 29.99 degrees of back tilt) but may prevent the lawnmower 10 from starting or restarting unless the lawnmower 10 is in an orientation with little to no back tilt (e.g., less than ten degrees of back tilt).

In some instances, the controller 200 may operate according to multiple different timing thresholds and tilt angle thresholds that are associated with each other to cause the controller 200 to change states. For example, a first tilt angle threshold of twenty degrees may allow the lawnmower 10 to remain operational (e.g., in the OPERATING state 1810) as long as the first tilt angle threshold is not exceeded for a first predetermined time period (e.g., two seconds, three seconds, or the like). However, if the first tilt angle threshold is exceeded for longer than the first predetermined time period, the controller 200 may switch from the OPERATING state 1810 to the STOP state 1815 to stop operation of the lawnmower 10. As another example, a second tilt angle threshold (e.g., fifty degrees) that is higher than the first tilt angle threshold may allow the lawnmower 10 to remain operational for a second shorter predetermined time period (e.g., 100 milliseconds, 500 milliseconds, or the like) or may immediately stop operation of the lawnmower 10 (e.g., a second predetermined time period of zero seconds) in response to the second tilt angle threshold being exceeded. Such different timing thresholds and tilt angle thresholds allow the controller 200 to react more quickly to situations where the blade(s) 20 are more exposed due to a larger tilt angle. In each of the above examples, a timer monitoring the respective predetermined time period may be reset to zero in response to one or more data samples from the IMU 290 indicating that the tilt angle of the lawnmower 10 no longer exceeds the respective tilt angle threshold.

Figure 19:
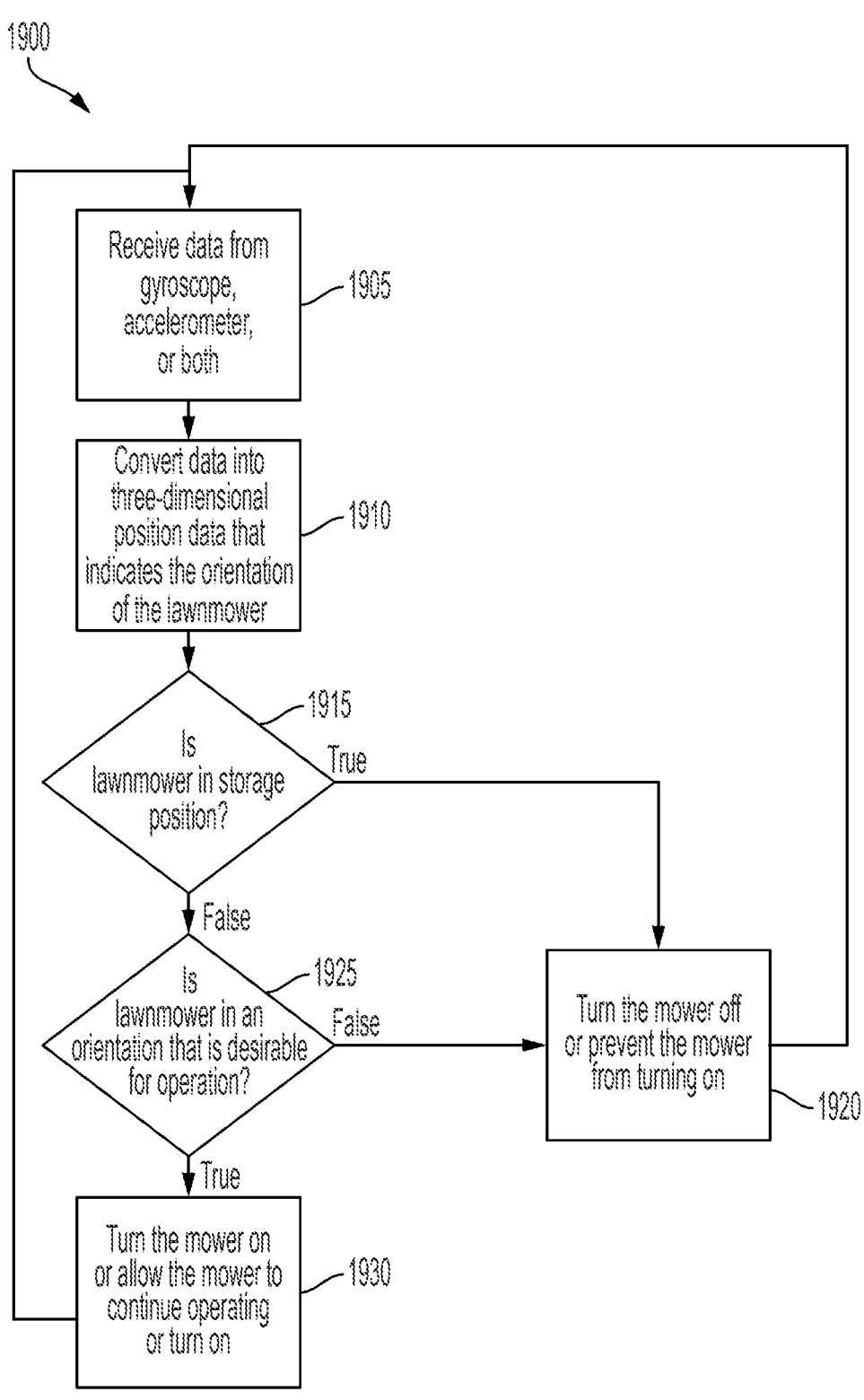
FIG. 19 is a block diagram of another method performed by the controller of FIG. 13, according to some embodiments.

FIG. 19 is a block diagram of a method 1900 performed by the controller 200 of FIG. 13 to control the lawnmower 10 based on an orientation of the lawnmower 10 determined based on data received from the IMU 290. At block 1905, data is received from the IMU 290 (e.g., from the gyroscope 292, the accelerometer 294, or both the gyroscope 292 and the accelerometer 294).

At block 1910, the data is converted into three-dimensional position data that indicates an orientation of the lawnmower 10 (and/or a change in the orientation of the lawnmower 10 with respect to previously received data). In some instances, the data from the gyroscope 292 is used in combination with the data from the accelerometer 294 to determine the three-dimensional position data that indicates the orientation of the lawnmower 10. In some instances, the data from each of the gyroscope 292 and the accelerometer is independently converted/processed to determine the three-dimensional position data that indicates the orientation of the lawnmower 10. For example, in instances where data from only one of the gyroscope 292 and the accelerometer 294 is received (at block 1905), such data may be processed on its own to determine the three-dimensional position data that indicates the orientation of the lawnmower 10. In some instances, block 1910 is performed by the IMU 290 such that the controller 200 receives converted/processed three-dimensional position data that indicates the orientation of the lawnmower 10 (at block 1905). As explained previously herein, data from the IMU 290 allows the controller 200 (and/or the IMU itself) to detect a change in motion, a change in force, or both experienced by the housing 12 of the lawnmower 10.

At block 1915, the controller 200 determines whether the lawnmower 10 is in a storage position (e.g., an upright position) as shown in FIG. 16. The controller 200 may determine whether the lawnmower 10 is in the storage position based on the three-dimensional position data calculated based on one or more data samples from the IMU 290. For example, the controller 200 may compare the three-dimensional position data to a first threshold (e.g., a tilt angle threshold) to determine whether the lawnmower 10 is in the storage position. For example, the tilt angle threshold may include a third tilt angle threshold that is close to ninety degrees (e.g., 70 degrees, 75 degrees, or the like).

In response to determining that the lawnmower 10 is in the storage position (at block 1915), at block 1920, the controller 200 turns off the lawnmower 10 or prevents the lawnmower 10 from turning on. In other words, in response to determining that the lawnmower 10 is in the storage position, the controller 200 enters or remains in the STOP state 1815 of FIG. 18. Turning off the lawnmower 10 or preventing the lawnmower 10 from turning on (at block 1920) may include the controller 200 disabling the motor 280 and/or the auxiliary motor or preventing starting/operation of the motor 280 and/or the auxiliary motor.

On the other hand, in response to determining that the lawnmower 10 is not in the storage position (at block 1915), at block 1925, the controller 200 determines whether the lawnmower 10 is in an orientation that is desirable for operation (e.g., a desirable operating position/orientation). As explained previously herein, to determine whether the lawnmower 10 is in a desirable orientation, the controller 200 may compare the three-dimensional position data to one or more thresholds (e.g., tilt thresholds) to determine whether one or more tilt angles (e.g., back/forward tilt angle, side-to-side tilt angle, etc.) are above a predetermined threshold (and in some instances, whether the one or more tilt angles are above a predetermined threshold for a respective predetermined time period). In some instances, in response to determining that one or more tilt angles of a current orientation of the lawnmower 10 is greater than a respective tilt angle threshold, the controller 200 may determine that the lawnmower 10 is not in a desirable orientation for operation (i.e., that the lawnmower 10 is in an undesirable orientation). As explained previously herein, the tilt angle thresholds used by the controller 200 to make the comparison at block 1925 may be different depending on the current state of the controller 200 and/or depending on the state to which the data samples indicate that the controller 200 should switch. Also as explained previously herein, predetermined time periods during which a respective tilt threshold is exceeded in order to cause a change in operational state of the lawnmower 10/controller 200 may be different for different tilt angle thresholds.

In response to determining that the lawnmower 10 is not in a desirable orientation for operation (at block 1925), at block 1920, the controller 200 turns off the lawnmower 10 or prevents the lawnmower 10 from turning on. In other words, in response to determining that the lawnmower 10 is not in a desirable orientation for operation (at block 1925), the controller 200 enters or remains in the STOP state 1815 of FIG. 18.

On the other hand, in response to determining that the lawnmower 10 is in a desirable orientation for operation (at block 1925), at block 1930 the controller 200 turns the lawnmower 10 on (if the paddles 26 are actuated) or allows the lawnmower 10 to continue operating or turn on (again, if/when the paddles 26 are actuated). In other words, in response to determining that the lawnmower 10 is in a desirable orientation for operation (at block 1925), the controller 200 enters or remains in the OPERATING state 1810 (if the paddles 26 are actuated) or the READY state 1805 (if the paddles 26 are not actuated) of FIG. 18.

Although not shown in FIG. 19, in some instances, the controller 200 may enter a sleep mode in response to determining that the lawnmower 10 is in the storage position (at block 1915). For example, in the sleep mode, the controller 200 may poll the IMU 290 for data less often or may stop receiving data from the IMU 290 until a user input (e.g., actuation of the paddles 26) or a detected change in the orientation causes the controller 200 to wake up from the sleep mode. In some of such instances, upon waking up from the sleep mode, the controller 200 may enter the STOP state 1815 by default and poll the IMU 290 (e.g., for a predetermined time period or amount of data samples) to determine the orientation of the lawnmower 10.

Although shown separately in FIG. 19, in some instances, blocks 1915 and 1925 are combined since the storage position is an undesirable orientation for operation of the lawnmower 10.

As indicated in FIG. 19, after performing blocks 1920 and/or 1930, the method 1900 proceeds back to block 1905 to repeat such that the controller 200 repeatedly determines the orientation of the lawnmower 10 and which operational state to remain in or enter based on the orientation of the lawnmower 10 and the state of the paddles 26. As explained above, in some instances, the controller 200 may slow or cease repetition of the method 1900 when the controller 200 is in the sleep mode (e.g., in response to determining that the lawnmower 10 is in the storage position).

As explained previously herein, in some instances, filtering schemes and/or hysteresis analysis are implemented by the controller 200 during execution of the method 1900. For example, a de-bounce timer may be implemented by the controller 200 (e.g., at blocks 1915 and/or 1925) to ensure that the detected orientation of the lawnmower 10 is consistent for a duration of a de-bounce time period and is not falsely indicated based on, for example, the lawnmower 10 contacting an object that alters data samples from the IMU 290 very briefly. The de-bounce timer may be used to compare a value of the de-bounce timer to a predetermined time period associated with a respective tilt angle threshold.

Thus, embodiments described herein provide, among other things, a lawnmower including an inertial measurement unit (IMU) and/or an accelerometer for orientation sensing.

We claim:

1. A lawnmower comprising:

a housing;

one or more cutting blades;

a motor configured to rotate the one or more cutting blades;

a handle extending from the housing and configured to be manipulated by a user during operation of the lawnmower;

an inertial measurement device configured to generate data indicative of an orientation of the housing; and a controller connected to the motor and to the inertial measurement device, the controller configured to:

receive, from the inertial measurement device, the data indicative of the orientation of the housing, determine a three-dimensional position of the housing based on the data, wherein the three-dimensional position of the housing indicates whether the orientation of the housing is desirable for operation of the lawnmower or undesirable for operation of the lawnmower, determine that the lawnmower is in a storage position that is undesirable for operation of the lawnmower based on the three-dimensional position of the housing, wherein in the storage position the handle is folded towards the housing of the lawnmower or the housing is tilted on its side, and prevent or stop operation in response to determining that the lawnmower is in the storage position.

2. The lawnmower of claim 1, wherein the controller is configured to:

determine that the lawnmower is in the storage position based on the three-dimensional position of the housing indicating that the housing is experiencing a tilt angle greater than a first predetermined tilt angle threshold for a predetermined duration, determine, based on the lawnmower not being in the storage position, that the three-dimensional position of the housing indicates that the housing is experiencing a tilt angle greater than a second predetermined tilt angle threshold; and prevent or stop operation of the motor in response to determining that the three-dimensional position of the housing indicates that the housing is experiencing the tilt angle greater than the second predetermined tilt angle threshold.

3. The lawnmower of claim 2, wherein the controller is configured to:

determine that the three-dimensional position of the housing indicates that the tilt angle has been greater than the second predetermined tilt angle threshold for longer than a predetermined time period; and prevent or stop operation of the motor in response to determining that the tilt angle has been greater than the second predetermined tilt angle threshold for longer than the predetermined time period.

4. The lawnmower of claim 3, wherein the second predetermined tilt angle threshold includes a back tilt threshold and a side tilt threshold that are each associated with a respective predetermined time period; and wherein (i) a first angle value of the back tilt threshold is higher than a second angle value of the side tilt threshold, (ii) a first time value of a first predetermined time period associated with the back tilt threshold is larger than a second time value of a second predetermined time period associated with the side tilt threshold, or both (i) and (ii).

5. The lawnmower of claim 3, wherein the second predetermined tilt angle threshold includes a first back tilt threshold and a second back tilt threshold that are each associated with a respective predetermined time period; and wherein (i) a first angle value of the first back tilt threshold is lower than a second angle value of the second back tilt threshold and (ii) a first time value of a first predetermined time period associated with the first back tilt threshold is higher than a second time value of a second predetermined time period associated with the second back tilt threshold.

6. The lawnmower of claim 2, wherein the controller is configured to:

determine that the three-dimensional position of the housing indicates that the tilt angle is less than a third predetermined tilt angle threshold; and allow operation of the motor in response to (i) determining that the three-dimensional position of the housing indicates that the tilt angle is less than the third predetermined tilt angle threshold and (ii) receiving a user input indicating that the motor should operate.

7. The lawnmower of claim 6, wherein the third predetermined tilt angle threshold is less than the predetermined tilt angle threshold.

8. The lawnmower of claim 1, wherein the controller is configured to determine the three-dimensional position of the housing based on the data by executing a filtering scheme that includes averaging a plurality of data samples included in the data over a predetermined time period or for a predetermined number of consecutive data samples.

9. The lawnmower of claim 1, wherein:

in response to determining that the lawnmower is in the storage position, the controller is configured to enter a sleep mode until (i) the controller detects a user input or (ii) the controller detects a change in the three-dimensional position of the housing, wherein the controller receives the data from the inertial measurement device less frequently in the sleep mode than when the controller is operating outside of the sleep mode; and the one or more cutting blades are exposed in the storage position.

10. A method of controlling a lawnmower, the method comprising:

receiving, with a controller of the lawnmower and from an inertial measurement device of the lawnmower, data indicative of an orientation of a housing of the lawnmower, the lawnmower including:

one or more cutting blades, a motor configured to rotate the one or more cutting blades, and a handle extending from the housing and configured to be manipulated by a user during operation of the lawnmower;

determining, with the controller, a three-dimensional position of the housing based on the data, wherein the three-dimensional position of the housing indicates whether the orientation of the housing is desirable for operation of the lawnmower and whether the lawnmower is in a storage position that is undesirable for operation of the lawnmower, wherein in the storage position the handle is folded towards the housing of the lawnmower or the housing is tilted on its side; and preventing or stopping, with the controller, operation in response to determining that the lawnmower is in the storage position.

11. The method of claim 10, wherein controlling the motor based on the three-dimensional position of the housing includes:

determining, with the controller, that the three-dimensional position of the housing indicates that the housing is experiencing a tilt angle greater than a predetermined tilt angle threshold; and preventing or stopping, with the controller, operation of the motor in response to determining that the three-dimensional position of the housing indicates that the housing is experiencing the tilt angle greater than the predetermined tilt angle threshold.

12. The method of claim 11, wherein controlling the motor based on the three-dimensional position of the housing includes:

determining, with the controller, that the three-dimensional position of the housing indicates that the tilt angle has been greater than the predetermined tilt angle threshold for longer than a predetermined time period; and preventing or stopping, with the controller, operation of the motor in response to determining that the tilt angle has been greater than the predetermined tilt angle threshold for longer than the predetermined time period.

13. The method of claim 12, wherein the predetermined tilt angle threshold includes a back tilt threshold and a side tilt threshold that are each associated with a respective predetermined time period; and wherein (i) a first angle value of the back tilt threshold is higher than a second angle value of the side tilt threshold, (ii) a first time value of a first predetermined time period associated with the back tilt threshold is larger than a second time value of a second predetermined time period associated with the side tilt threshold, or both (i) and (ii).

14. The method of claim 12, wherein the predetermined tilt angle threshold includes a first back tilt threshold and a second back tilt threshold that are each associated with a respective predetermined time period; and wherein (i) a first angle value of the first back tilt threshold is lower than a second angle value of the second back tilt threshold and (ii) a first time value of a first predetermined time period associated with the first back tilt threshold is higher than a second time value of a second predetermined time period associated with the second back tilt threshold.

15. The method of claim 11, wherein controlling the motor based on the three-dimensional position of the housing includes:

determining, with the controller, that the three-dimensional position of the housing indicates that the tilt angle is less than a second predetermined tilt angle threshold; and allowing, with the controller, operation of the motor in response to (i) determining that the three-dimensional position of the housing indicates that the tilt angle is less than the second predetermined tilt angle threshold and (ii) receiving a user input indicating that the motor should operate.

16. A lawnmower comprising:

a housing;

one or more cutting blades;

a motor configured to rotate the one or more cutting blades;

a handle extending from the housing and configured to be manipulated by a user during operation of the lawnmower;

an inertial measurement device configured to generate data indicative of an orientation of the housing; and a controller connected to the motor and to the inertial measurement device, the controller configured to:

receive, from the inertial measurement device, the data indicative of the orientation of the housing, determine the orientation of the housing based on the data, wherein the orientation of the housing indicates whether the orientation of the housing is desirable for operation of the lawnmower or whether the lawnmower is in a storage position, wherein in the storage position the handle is folded towards the housing of the lawnmower or the housing is tilted on its side; and control the lawnmower to be in one of a plurality of states based on the orientation of the housing.

17. The lawnmower of claim 16, wherein the plurality of states include:

a ready state in which the motor is not operating but is allowed to operate in response to a user input indicating that the motor should operate;

an operating state in which the motor is operating; and a stop state in which the motor is disabled and is configured not to operate regardless of whether of the user input indicates that the motor should operate.

18. The lawnmower of claim 16, wherein the controller is configured to:

determine that the orientation of the housing indicates that the housing is experiencing a tilt angle greater than a predetermined tilt angle threshold; and transition the lawnmower to a stop state to prevent or stop operation of the motor in response to determining that the orientation of the housing indicates that the housing is experiencing the tilt angle greater than the predetermined tilt angle threshold.

19. The lawnmower of claim 16, wherein the controller is configured to implement a hysteresis analysis for transitioning between at least two states of the plurality of states by changing from a first state to a second state in response to (i) receiving a predetermined amount of data samples that indicate a consistent orientation of the lawnmower or (ii) receiving data samples that indicate the consistent orientation of the lawnmower over a predetermined time period.

20. The lawnmower of claim 19, wherein a first predetermined amount of data samples or a first predetermined time period over which data samples are received that indicate the consistent orientation of the lawnmower for transitioning from the first state to the second state is different than a second predetermined amount of data samples or a second predetermined time period over which data samples are received that indicate the consistent orientation of the lawnmower for transitioning (i) from the second state to the first state, (ii) from the first state to a third state, (iii) from the third state to the first state, or between other states.

* * * * *